(12) United States Patent
Bishop

(10) Patent No.: US 10,669,006 B2
(45) Date of Patent: Jun. 2, 2020

(54) INTERFACE BETWEEN AN OUTER END OF A WING AND A MOVEABLE WING TIP DEVICE

(71) Applicant: Airbus Operations Limited, Bristol (GB)

(72) Inventor: Benjamin Bishop, Bristol (GB)

(73) Assignee: Airbus Operations Limited, Bristol (GB)

( * ) Notice: Subject to any disclaimer, the term of this patent is extended or adjusted under 35 U.S.C. 154(b) by 385 days.

(21) Appl. No.: 15/618,844

(22) Filed: Jun. 9, 2017

(65) Prior Publication Data

US 2017/0355439 A1  Dec. 14, 2017

(30) Foreign Application Priority Data

Jun. 9, 2016 (GB) .................................. 1610108.1

(51) Int. Cl.
  *B64C 3/56* (2006.01)
  *B64C 23/06* (2006.01)
  *B64F 5/00* (2017.01)
  *F16J 15/10* (2006.01)

(52) U.S. Cl.
  CPC .............. *B64C 3/56* (2013.01); *B64C 23/072* (2017.05); *B64F 5/00* (2013.01); *F16J 15/102* (2013.01)

(58) Field of Classification Search
  CPC .... B64C 3/56; B64C 11/28; B64F 5/00; F16J 15/102
  See application file for complete search history.

(56) References Cited

U.S. PATENT DOCUMENTS

| 2013/0099060 | A1  | 4/2013  | Dees et al. |
| 2013/0341467 | A1* | 12/2013 | Sakurai ..................... B64C 3/56 244/201 |
| 2015/0097087 | A1* | 4/2015  | Sakurai ..................... B64C 9/00 244/201 |
| 2017/0152016 | A1* | 6/2017  | Napier .................... B64C 3/185 |

(Continued)

FOREIGN PATENT DOCUMENTS

| GB | 447577 | 5/1936 |
| GB | 627121 | 7/1949 |

(Continued)

OTHER PUBLICATIONS

Combined Search and Examination Report for GB1610108.1 dated Nov. 30, 2016, 7 pages.

*Primary Examiner* — Rodney A Bonnette
(74) *Attorney, Agent, or Firm* — Nixon & Vanderhye P.C.

(57) ABSTRACT

An aircraft (102) including a wing (101), having a fixed wing (105) with a wing tip device (103) moveably mounted at the outer end thereof. The wing tip device (103) is moveable between: a flight configuration; and a ground configuration. The wing tip device (103) and the fixed wing (105) are separated along an oblique primary cut plane (113). The wing tip device (103) and the fixed wing (105) meet along an interfacing cut line (135). The interfacing cut line (135) comprises a first length (137) offset from the primary cut plane (113) in a first direction; a second length (141) offset from the primary cut plane (113) in a second direction, opposite to the first direction; and a transition section (139) over which the interfacing cut line (135) transitions from the first length to the second length.

27 Claims, 24 Drawing Sheets

(56) References Cited

U.S. PATENT DOCUMENTS

| | | | |
|---|---|---|---|
| 2017/0321804 A1* | 11/2017 | Soman | B64C 3/56 |
| 2017/0355436 A1* | 12/2017 | Thompson | B64C 3/187 |
| 2017/0355437 A1 | 12/2017 | Bishop et al. | |
| 2017/0355438 A1 | 12/2017 | Bishop et al. | |
| 2017/0355440 A1 | 12/2017 | Bishop | |
| 2018/0312242 A1* | 11/2018 | Brakes | B64C 3/56 |
| 2019/0161161 A1* | 5/2019 | Bishop | B64C 3/38 |
| 2019/0161162 A1* | 5/2019 | Bishop | B64C 3/56 |

FOREIGN PATENT DOCUMENTS

| | | |
|---|---|---|
| GB | 2524828 | 10/2015 |
| WO | 2012/131335 | 10/2012 |
| WO | 2015/150816 | 10/2015 |
| WO | WO 2015/150835 | 10/2015 |

* cited by examiner

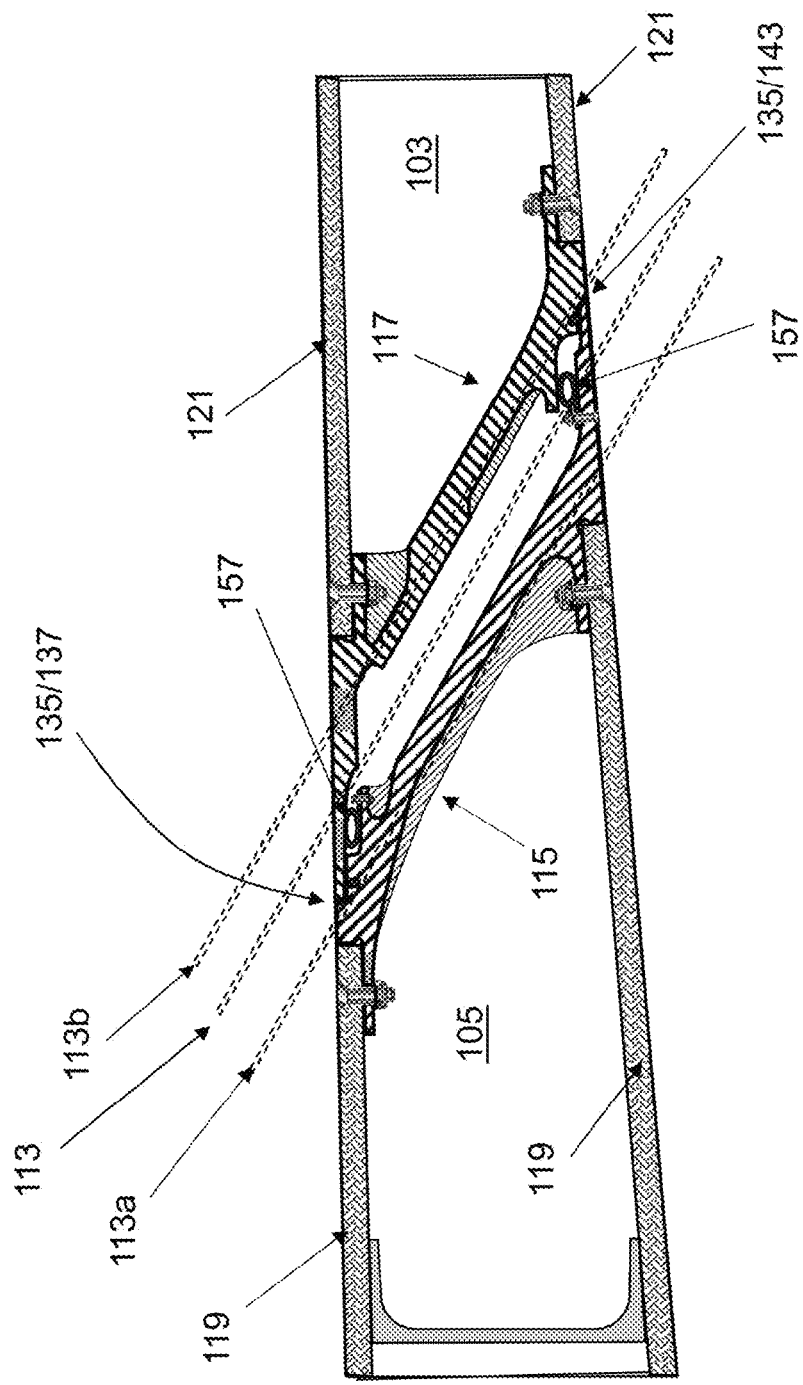

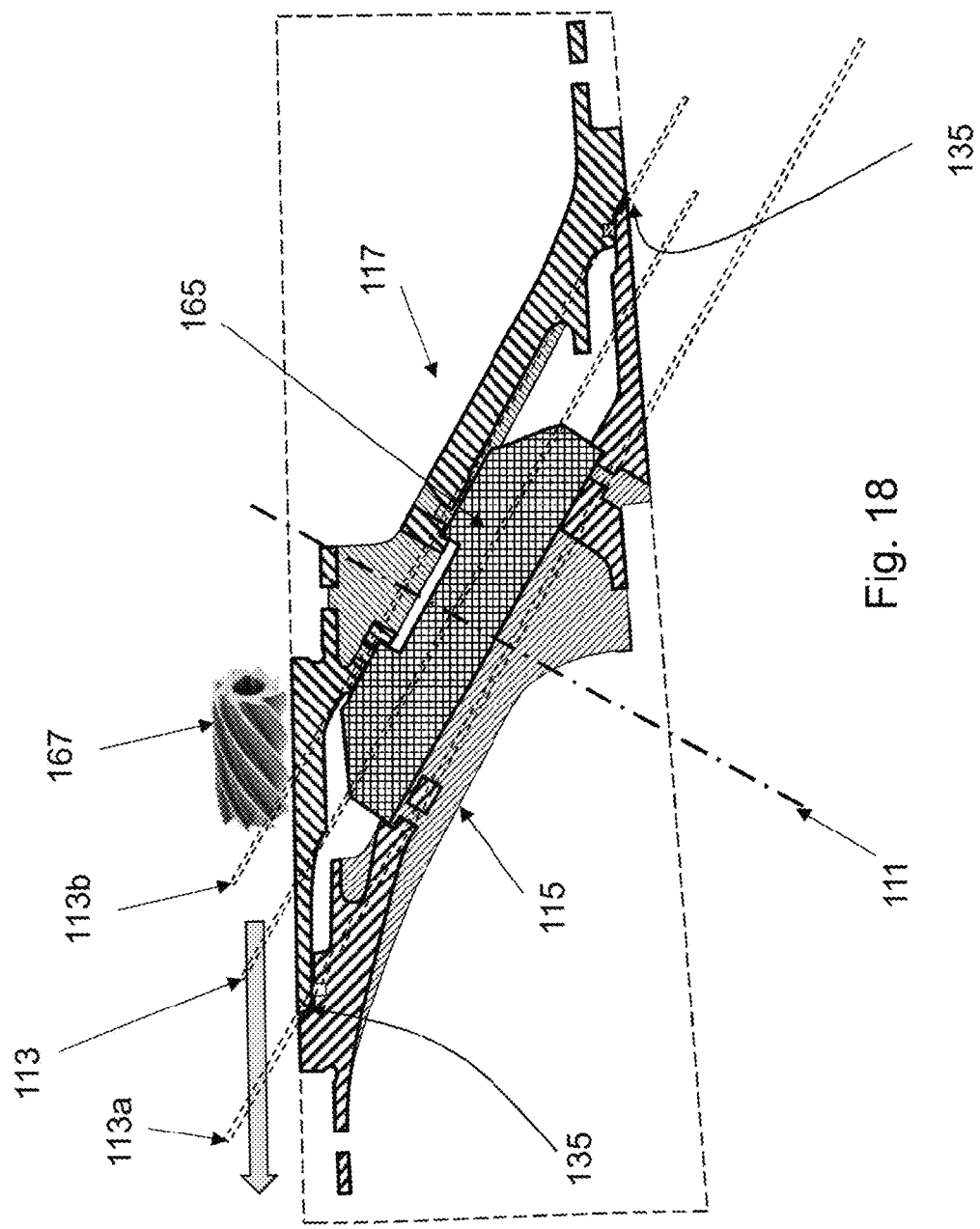

INTERFACE BETWEEN AN OUTER END OF A WING AND A MOVEABLE WING TIP DEVICE

RELATED APPLICATION

This application claims priority to United Kingdom patent application 1610108.1 filed Jun. 9, 2016, the entire contents of which is incorporated by reference.

BACKGROUND OF THE INVENTION

There is a trend towards increasingly large passenger aircraft, for which it is desirable to have correspondingly large wing spans. However, the maximum aircraft span is effectively limited by airport operating rules which govern various clearances required when manoeuvering around the airport (such as the span and/or ground clearance required for gate entry and safe taxiway usage).

To address this problem, various arrangements comprising moveable wing tip devices, that specifically enable the span to be reduced in a ground configuration, have been suggested.

WO2015/150835 is an example of a suggested arrangement. In the arrangement of WO2015/150835 the wing tip device and the fixed wing are separated along an oblique cut plane and the wing tip device is rotatable about an axis of rotation perpendicular to that cut plane.

In the arrangement of WO2015/150835, sealing the interface between the fixed wing and the wing tip device (when the wing tip device is in the flight configuration) has been found to be problematic. More specifically, as the wing tip device rotates between the flight and the ground configurations, relative sliding motion occurs at the interface between the outer end of the fixed wing and the inner end of the wing tip device. Whilst a sliding seal may, in principle, be employed, such a solution is sub-optimal because sliding seals tend to be subjected to relatively large amounts of wear. This may make them susceptible to wear and/or damage and may therefore necessitate frequent inspection and/or replacement of the seal.

Aspects of the present invention seek to address this problem.

SUMMARY OF THE INVENTION

According to a first aspect of the invention, there is provided an aircraft comprising a wing, the wing having a fixed wing with a wing tip device moveably mounted at the outer end thereof, the wing tip device being moveable between: (a) a flight configuration for use during flight; and (b) a ground configuration for use during ground-based operations, in which ground configuration the wing tip device is moved away from the flight configuration such that the span of the aircraft wing is reduced, wherein the wing tip device and the fixed wing are separated along a primary cut plane, the primary cut plane being obliquely orientated, and the wing tip device being rotatable between the flight and ground configurations, about an axis of rotation orientated normal to the primary cut plane, and wherein when the wing tip device is in the flight configuration, the outer end of the fixed wing and the inner end of the wing tip device meet along an interfacing cut line that separates the outer surfaces of the fixed wing and the wing tip device. The interfacing cut line comprises: (i) a first length, formed by a cut through the outer surface, but offset from the primary cut plane in a first direction; (ii) a second length, formed by a cut through the outer surface but offset from the primary cut plane in a second direction, opposite to the first direction; and (iii) a transition section over which the interfacing cut line transitions from the first length to the second length.

Separating the interfacing cut line into the first and second lengths has been found to be beneficial. More particularly, since the first and second lengths are offset from the primary cut plane (in opposing directions), when the wing tip device rotates about its axis of rotation there tends to be limited, or no, sliding contact movement along these lengths. Instead, the fixed wing and the wing tip device tend to separate (along the first and second lengths) under a local translational movement. This is beneficial because it may enable a non-sliding seal (for example a compression seal) to be employed along these lengths.

In the transition section, the interfacing cut line transitions from the first length to the second length. The transition section may be relatively short. The transition section may be shorter than the first and the second lengths.

When the wing tip device rotates from the flight configuration to the ground configuration, the wing tip device may contact the fixed wing at a sliding contact along the transition section. The sliding contact may move along the transition section as the wing tip device rotates. The wing tip device may separate away from the fixed wing along the first length and second length. The separation is preferably a translational movement of the opposing parts of the fixed wing and the wing tip device, away from each other. It will be appreciated that the wing tip device rotates about the axis of rotation, so the separation/translational movement referred to is a local movement in the vicinity of the interface—when considering the wing tip device as a whole, it rotates relative to the fixed wing. The sliding contact is preferably only within the transition section. There is preferably no sliding contact along the first and the second lengths.

At least part of the transition section may lie along a plane that is parallel to the primary cut plane. The sliding contact may occur along that part of the transition section.

The separating movement along the first and second lengths may be in opposite directions. For example, the first and second lengths may be either side of the rotational axis such that when the wing tip device rotates from the flight configuration to the ground configuration the first length moves in a first direction, and the second length moves in a second, opposite, direction. Having both the first and second lengths offset from the primary cut plane tends to enable such movement, whilst avoiding clashing between the fixed wing and the wing tip device.

The wing tip device is rotatable between the flight and ground configurations, about an axis of rotation. The axis of rotation is orientated normal to the oblique primary cut plane.

In principle, the first and second lengths may be a number of shapes and/or orientations, so long as they do not result in clashing between the fixed wing and the wing tip device as it rotates. The exact shape may depend on the location of the line relative to the rotational axis (e.g. whether it is fore/aft of the axis). In some preferred embodiments, the first length may be in a first plane that is parallel to the primary cut plane but offset from the primary cut plane in the first direction. The second length may be in a second plane that is parallel to the primary cut plane but offset from the primary cut plane in the second direction. Such an arrangement has been found to be especially beneficial in terms of avoiding clashing.

The orientation of the axis is preferably such that when the wing tip device is rotated about the axis, from the flight configuration to the ground configuration, the span of the aircraft wing is reduced.

The cut plane is oblique. The cut plane preferably extends through the upper and lower surfaces of the wing. The distance, along the upper surface of the wing, from the root of the wing to the cut plane (i.e. to where the cut plane intersects the upper surface) may be less than the distance, along the lower surface of the wing, from the root of the wing to the cut plane (i.e. to where the cut plane intersects the lower surface). Thus, the cut plane may create an overcut with respect to the fixed wing. In other embodiments, the distance, along the upper surface of the wing, from the root of the wing to the cut plane (i.e. to where the cut plane intersects the upper surface) may be more than the distance, along the lower surface of the wing, from the root of the wing to the cut plane (i.e. to where the cut plane intersects the lower surface). Thus, the cut plane may create an undercut with respect to the fixed wing.

The primary cut plane is preferably a notional plane separating the fixed wing and the wing tip device (for example a cut plane created during the design phase of the wing). It will be appreciated that the cut plane need not necessarily manifest itself as a physical, planar, surface throughout the depth of the wing.

The axis of rotation may be orientated at an angle to (i.e. not including being parallel or perpendicular to a longitudinal direction. The axis is preferably at an angle to (i.e. not including being parallel or perpendicular to a lateral direction. The axis is preferably at an angle to (i.e. not including being parallel or perpendicular to a vertical direction. The vertical, longitudinal and lateral directions may be mutually perpendicular. In some embodiments, the longitudinal, lateral and vertical directions may be in an absolute frame of reference (i.e. longitudinal is fore-aft, lateral is port-starboard and vertical is vertical from the ground). The longitudinal direction may be a chordwise direction; the lateral direction may be a spanwise direction. In other embodiments, it may be appropriate to use the longitudinal, lateral and vertical directions in a frame of reference local to the wing. For example, for a swept wing the longitudinal direction may instead be along the length of the wing, and the lateral direction may be along the width of the wing (i.e. from the leading to the trailing edges, measured perpendicular to the longitudinal direction). Alternatively or additionally, for a wing with dihedral, the vertical direction may be perpendicular to the plane of the wing. In all cases, the cut plane/axis is orientated such that the span of the wing is reduced when the wing tip device is rotated about the axis.

The wing tip device is preferably rotatable about a single axis of rotation. For example, the rotation of the wing tip device is preferably not the result of a compound rotation (I.e. a net rotation created by a plurality of separate rotations about separate axes).

The axis is preferably at an angle of less than 45 degrees, and more preferably less than 25 degrees, from the vertical. The axis may be at an angle of 15 degrees from the vertical axis. The present invention has been found to be especially beneficial in embodiments in which the axis is at a relatively small angle from the vertical because the orientation of axis results in a shallow cut plane and the area of the interface between the fixed wing and wing tip device may therefore be relatively large.

Embodiments of the present invention have been found to be especially beneficial when there is a desire to create a seal between the fixed wing and the wing tip device. The wing may comprise a sealing assembly for sealing between the fixed wing and the wing tip device when the wing tip device is in the flight configuration.

The sealing assembly may comprise a sliding seal for making/breaking a seal under a relative sliding action between the fixed wing and the wing tip device. The sealing assembly may comprise a compression seal for making/breaking a seal under a relative coming together/separation of the fixed wing and wing tip device. The sliding seal may be associated with the transition section. The compression seal may be associated with the first and second lengths.

The wing may comprise a first seal support structure. The first seal support structure may be located below the outer surface of the wing. The first seal support structure may extend beyond the first length and towards the primary cut plane. The first seal support structure may be located below the first length of the interfacing cut line, such that it under-laps the interfacing cut line. Such an arrangement has been found to be beneficial because the seal-support structure can support a compression seal that is compressed in the region of under-lap (when the wing tip device is in the flight configuration).

The wing may comprise a second seal support structure. The second seal support structure may be located below the outer surface of the wing. The second seal support structure may extend beyond the second length and towards the primary cut plane. The second seal support structure may be located below the second length of the interfacing cut line, such that it under-laps the interfacing cut line. Such an arrangement has been found to be beneficial because the seal-support structure can support a compression seal that is compressed in the region of under-lap (when the wing tip device is in the flight configuration).

It will be appreciated that references to 'below' in this context are made with reference to the outer surface of the wing, and not necessarily in an absolute reference frame.

The first and/or second seal support structures may, in principle, be cut in a cut plane that is non-parallel to the primary cut plane. More preferably however, the first and/or second seal support structures extend up to a cut in a cut plane parallel to the primary cut plane (and therefore also parallel to the first and second cut planes). The first and/or second seal support structures may extend substantially up to the primary cut plane.

There is preferably a sliding contact along the transition section. The wing thus preferably does not comprise an under-lap in the region of the transition section.

The wing may comprise an upper surface extending from the leading edge, over the wing, to the trailing edge. The wing may comprise a lower surface extending from the leading edge, under the wing, to the trailing edge. The first and second lengths may both be along one of the upper surface or the lower surface of the wing. Such an arrangement is especially beneficial when the first and second lengths are either side of the axis of rotation, as the lengths on the same (upper or lower) surface will tend to move in opposite directions as the wing tip device rotates.

The interfacing cut line may further comprise: (iv) a third length, formed by cut through the outer surface but offset from the primary cut plane in the first direction; (v) a fourth length, formed by a cut through the outer surface but offset from the primary cut plane in the second direction; and (vi) a second transition section in which the interfacing cut line transitions from the third length to the fourth length.

When the wing tip device rotates from the flight configuration to the ground configuration, the wing tip device may contact the fixed wing at a sliding contact along the second transition section. The sliding contact may move along the second transition section as the wing tip device rotates. The wing tip device may separate away from the fixed wing along the third length and fourth length. The separation is preferably a translational movement of the opposing parts of the fixed wing and the wing tip device, away from each other.

In embodiments in which the first and second lengths are on one of the upper or lower surface of the wing, the third and fourth lengths may both be along the other one of the upper surface or the lower surface of the wing.

The second length may be located fore of the axis of rotation and the first length may be located aft of the axis of rotation. In embodiments comprising third and fourth lengths, the third length may be located aft of the axis of rotation and the fourth length may be located fore of the axis of rotation.

The interfacing cut line may comprise further transition sections between the first and third lengths, and the fourth and second lengths. The further transition sections are preferably such that the interfacing cut line is made up of the first to fourth lengths, each length transitioning into the adjacent length by a respective transition section. The further transition sections may be in the vicinity of the leading and trailing edges of the wing. In these regions, the curvature of the wing tends to be very high, so there is little or no sliding movement between the fixed wing and the wing tip device as the wing tip device rotates. Thus, in some embodiments, the further transition regions may not necessarily include a sliding contact between the fixed wing and the wing tip device.

It will be appreciated from the paragraphs above that in some embodiments, the interfacing cut line may thus be divided into 4 notional lengths (each separated by transition sections). Each of the lengths of the interfacing cut line may be adjacent (albeit linked by a transition section) to another length that is offset in the opposing direction. It will be appreciated that the adjacent lengths need not necessarily be consecutively numbered as per the first to fourth lengths above.

In some embodiments of the invention, there may be a relative sliding movement in the transition section, between the fixed wing and the wing tip device, during movement between the flight and the ground configuration. It has been recognised that it may be desirable to access the transition section more frequently than the other parts of the interfacing cut line. For example, it may be desirable to inspect the transition section to check for wear and/or damage. It may be desirable to access the transition section to repair or replace a part of a seal assembly. Accordingly, the wing may comprise an inspection panel associated with at least one transition section, through which the transition section may be accessed. The inspection panel may comprise a moveable panel operable from a closed configuration in which it forms a smooth surface of the wing, and an open configuration in which the transition section may be accessed. The inspection panel may be removeable. The inspection panel may form part of the outer surface of the wing.

In principle, the transition section may take a number of forms. In preferred embodiments, the transition section comprises a first portion lying within a plane that is parallel to the primary cut plane (for example within the first plane). The sliding contact may move along the first portion of the transition section when the wing tip device moves between the flight and ground configurations. The transition section may comprise a second portion at which the interfacing cut-line moves directly from the plane over to the second length of the interfacing cut line. Thus, part of the transition section may be an extension of the first length, and then comprise a junction (which may be a relatively sharp junction) at which the interfacing cut line moves from one plane to the other plane. The second portion of the transition section may be cut in another plane. The cut plane along the second portion is preferably orientated such that the cut through the wing skin is in a direction that it creates an interface orientated away from the airflow during normal use (i.e. the cut at the underside of the skin is upstream of the cut at the surface of the wing skin). Such an arrangement may be beneficial because it tends to inhibit flow through the interface (because the flow would need to reverse in order to flow through that interface).

In embodiments comprising a plurality of transition sections, it will be appreciated that any features herein described with reference to one transition section may apply equally to any or all of the other transition sections.

In embodiments of the present invention, the wing tip device is configurable between: (a) a flight configuration for use during flight and (b) a ground configuration for use during ground-based operations, in which ground configuration the wing tip device is moved away from the flight configuration such that the span of the aircraft wing is reduced. In the flight configuration, the span may exceed an airport compatibility limit. In the ground configuration the span may be reduced such that the span (with the wing tip device in the ground configuration) is less than, or substantially equal to, the airport compatibility limit. The airport compatibility limit is a span limit (for example relating to clearance restrictions for buildings, signs, other aircraft). The compatibility limit is preferably a gate limit.

The wing tip device may be a wing tip extension; for example the wing tip device may be a planar tip extension. In other embodiments, the wing tip device may comprise, or consist of, a non-planar device, such as a winglet.

In the flight configuration the trailing edge of the wing tip device is preferably a continuation of the trailing edge of the fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to another aspect of the invention, there is provided a wing for use as the wing in the first aspect. The wing may have a fixed wing with a wing tip device moveably mounted at the outer end thereof, the wing tip device being moveable between: (a) a flight configuration for use during flight; and (b) a ground configuration for use during ground-based operations, in which ground configuration the wing tip device is moved away from the flight configuration such that the span of the aircraft wing is reduced, wherein the wing tip device and the fixed wing are separated along a primary cut plane, the primary cut plane being obliquely orientated, and the wing tip device being rotatable between the flight and ground configurations, about an axis of rotation orientated normal to the primary cut plane, and wherein when the wing tip device is in the flight configuration, the outer end of the fixed wing and the inner end of the wing tip device meet along an interfacing cut line that separates the outer surfaces of the fixed wing and the wing tip device, the interfacing cut line comprising: (i) a first length, formed by a cut through the outer surface but offset from the primary cut plane in a first direction; (ii) a second length, formed by a cut through the outer surface but offset from the primary cut plane in a second direction, opposite to the first direction; and (iii) a transition section in which the interfacing cut line transitions from the first length to the second length.

According to another aspect of the invention, there is provided a fixed wing for use as the fixed wing in the first or second aspects. The fixed wing may be configured to receive a wing tip device that is separated along a primary cut plane, the primary cut plane being obliquely orientated, such that the wing tip device may be rotatable between the flight and ground configurations, about an axis of rotation orientated normal to the primary cut plane, and wherein the outer end of the fixed wing is shaped such that it would meet the inner end of the wing tip device meet along an interfacing cut line that separates the outer surfaces of the fixed wing and the wing tip device, the interfacing cut line comprising: (i) a first length, formed by a cut through the outer surface but offset from the primary cut plane in a first direction; (ii) a second length, formed by a cut through the outer surface but offset from the primary cut plane in a second direction, opposite to the first direction; and (iii) a transition section in which the interfacing cut line transitions from the first length to the second length.

According to another aspect of the invention, there is provided a wing tip device for use as the wing tip device in any of the above-mentioned aspects. The wing tip device may be configured to be received on a fixed wing that is separated along a primary cut plane, the primary cut plane being obliquely orientated, such that the wing tip device may be rotatable between the flight and ground configurations, about an axis of rotation orientated normal to the primary cut plane, and wherein the inner end of the wing tip device is shaped such that it would meet the outer end of the fixed wing along an interfacing cut line that separates the outer surfaces of the fixed wing and the wing tip device, the interfacing cut line comprising: (i) a first length, formed by a cut through the outer surface but offset from the primary cut plane in a first direction; (ii) a second length, formed by a cut through the outer surface but offset from the primary cut plane in a second direction, opposite to the first direction; and (iii) a transition section in which the interfacing cut line transitions from the first length to the second length.

According to yet another aspect of the invention, there is provided a method of designing an interface between the outer end of a fixed wing and the inner end of a wing tip device for an aircraft, the wing tip device being moveable between: (a) a flight configuration for use during flight; and (b) a ground configuration for use during ground-based operations, in which ground configuration the wing tip device is moved away from the flight configuration such that the span of the aircraft wing is reduced. The method may comprise the steps of: separating the wing tip device and the fixed wing along a primary cut plane, the primary cut plane being obliquely orientated, and the wing tip device being rotatable between the flight and ground configurations, about an axis of rotation orientated normal to the primary cut plane, defining an interfacing cut line that separates the outer surfaces of the fixed wing and the wing tip device, by defining (i) a first length, formed by cut through the outer surface but offset from the primary cut plane in a first direction; (ii) a second length, formed by a cut through the outer surface but offset from the primary cut plane in a second direction, opposite to the first direction; and (iii) a transition section in which the interfacing cut line transitions from the first length to the second length. The method may be a method of manufacture. In such case, the method may comprise the step of then manufacturing the wing tip device to the design.

It will be appreciated that any features described with reference to one aspect of the invention are equally applicable to any other aspect of the invention, and vice versa. For example features described with reference to the aircraft of the first aspect may also be applicable to the wing, wing tip device and/or methods of the other aspects of the invention, and vice versa.

DESCRIPTION OF THE DRAWINGS

Embodiments of the present invention will now be described by way of example only with reference to the accompanying schematic drawings of which:

FIG. 2b is a frontal view of the aircraft incorporating the wing of FIG. 2a;

FIG. 15a is a cut-away view aft of section A-A of FIG. 3, with the wing tip device in the flight configuration;

FIG. 18 is a cut-away view along the same sectional line A-A of FIG. 3, but showing the ribs being machined as a matched pair.

DETAILED DESCRIPTION

Figure 1A:
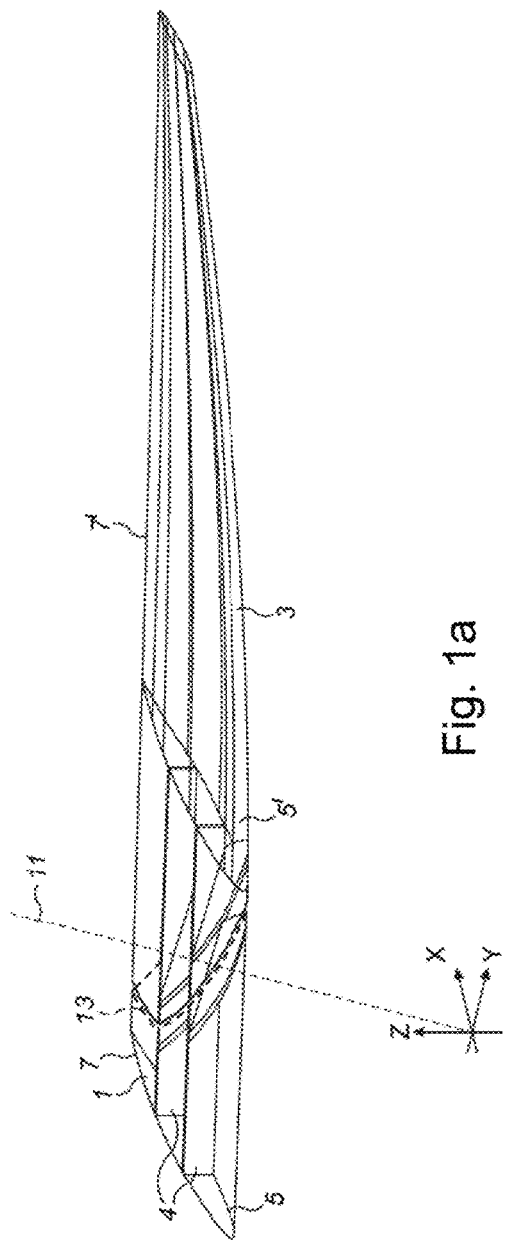
FIGS. 1a and 1b show a wing with a moveable wing tip device of the prior art.
Figure 1B:
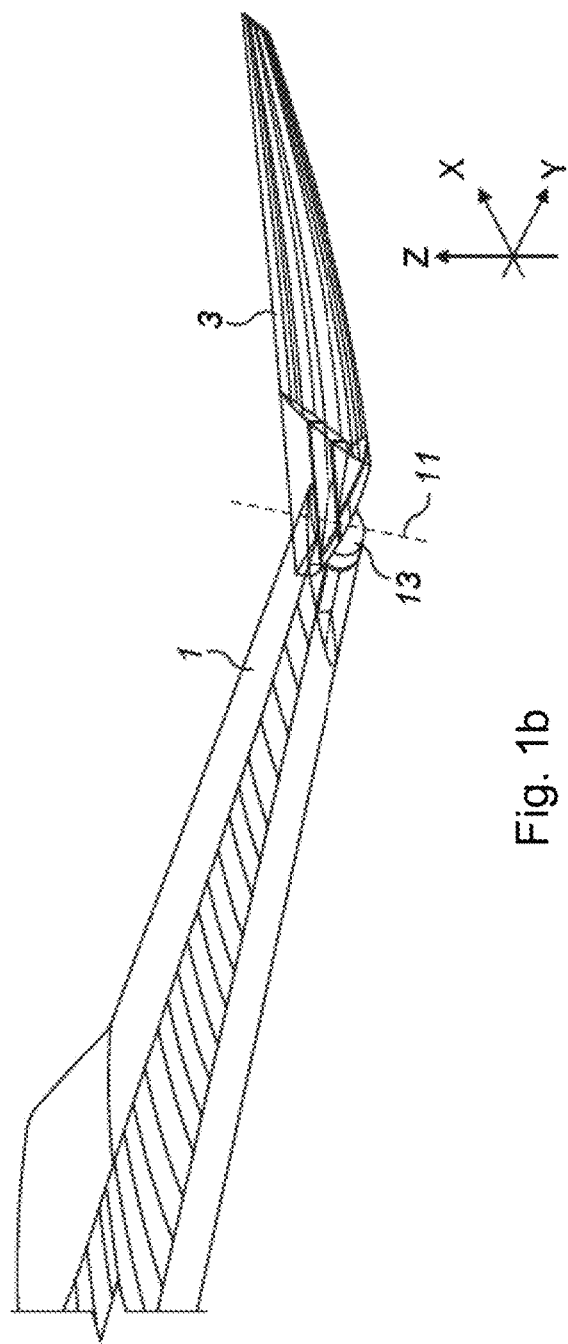

FIG. 1a is a perspective view of a fixed wing 1 and a wing tip device 3 on an aircraft shown in WO2015/150835. In summary, the wing tip device 3 is moveable between a flight configuration (FIG. 1a) and a ground configuration (FIG. 1b). In the flight configuration, the leading and trailing edges 5', 7' of the wing tip device 3 are continuations of the leading and trailing edges 5, 7 of the fixed wing 1. Furthermore, the upper and lower surfaces of the wing tip device 3 are continuations of the upper and lower surfaces of the fixed wing 1.

The wing tip device 3 is placed in the flight configuration for flight. In the flight configuration, the wing tip device 3 thus increases the span of the aircraft (thereby providing beneficial aerodynamic effects, for example, reducing the component of induced drag and increasing the lift). In principle, it would be desirable to maintain this large span at all times and simply have a large fixed wing. However, the maximum aircraft span is effectively limited by airport operating rules which govern various clearances required when manoeuvring around the airport (such as the span and/or ground clearance required for gate entry and safe taxiway usage). Thus, in the first embodiment of the invention, the wing tip device 3 is moveable to a ground configuration for use when on the ground.

In the ground configuration (FIG. 1b) the wing tip device 3 is folded, from the above-mentioned flight configuration, by rotating the wing tip device 3 about a rotational axis 11. By folding the wing tip device 3 in this manner, the span of the aircraft 2 is reduced. When the wing tip device 3 is in the ground configuration, the aircraft 2 thus complies with the above-mentioned airport clearances etc.

The movement of the wing tip devices is determined by the type of joint about which the wing tip device rotates relative to the fixed wing. To achieve the above-mentioned movement, the wing tip device 3 and the fixed wing 5 are separated along an oblique cut plane 13 passing through the upper and lower surfaces of the wing. The wing tip device 3 is rotatable about the axis 11 that extends in a direction perpendicular to the oblique cut plane 13. The axis 11 is orientated at an acute angle to all three mutually perpendicular axes X, Y and Z (i.e. chordwise, spanwise and vertical).

Small gaps, steps or other mismatch at the interface between the outer end of the fixed wing and the inner end of the wing tip device, when the moveable wing tip device is in the flight configuration, can create aerodynamic penalties (e.g. drag and pressure leakage). In some moveable wing tip arrangements, such as the one described above with reference to FIGS. 1a and 1b, it has been difficult to provide an interface that eliminates these features. For example, in some arrangements, controlling the tolerances in the vicinity of the interface has been found to be difficult. It has also been found to be difficult to provide an effective sealing arrangement to inhibit leakage flow through the interface.

Figure 2A:
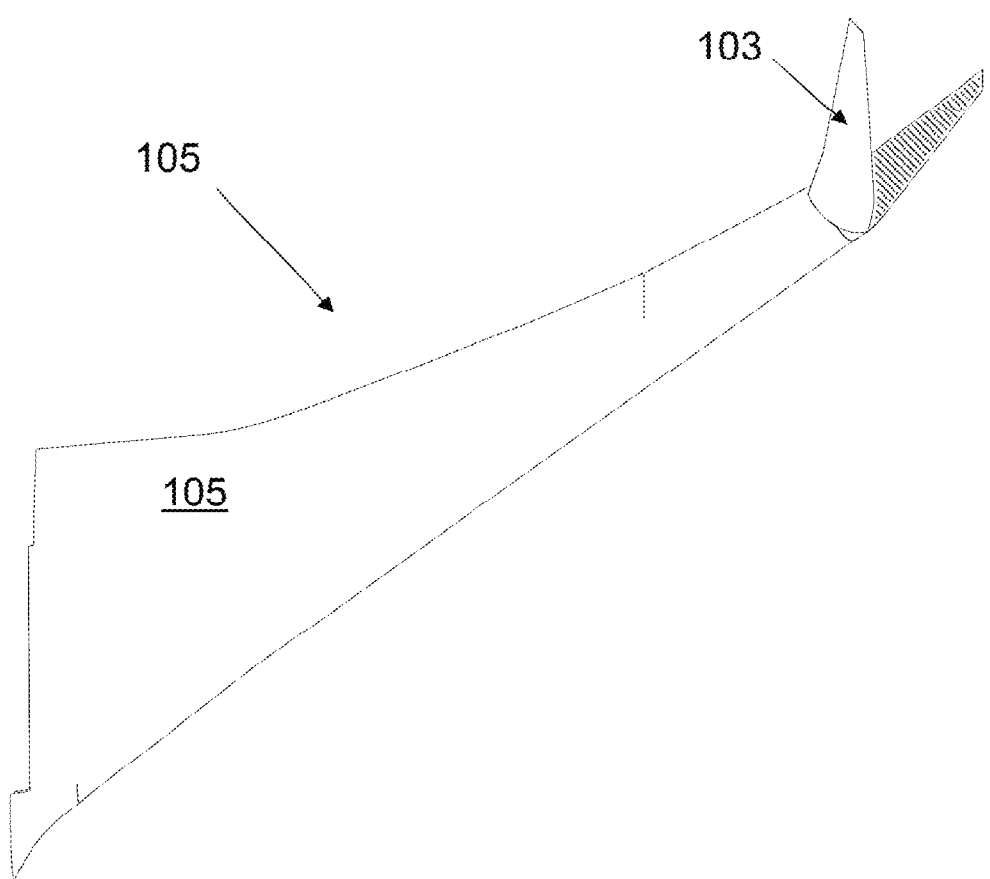
FIG. 2a shows a planform view of a wing on an aircraft of a first embodiment of the invention, the wing being shown with the wing tip device in both the flight and ground configurations.
Figure 2B:
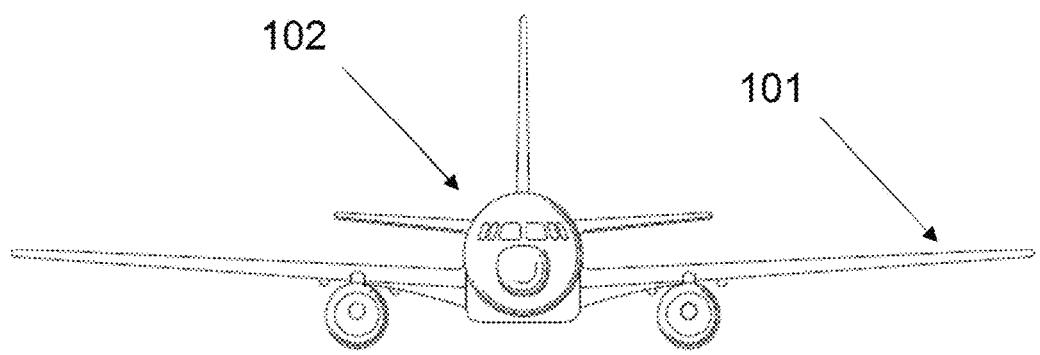

FIG. 2a shows a planform view of a wing 101 on an aircraft 102 of a first embodiment of the invention (the aircraft is shown in FIG. 2b). In FIG. 2a, the wing 101 is shown with the wing tip device 103 in both the flight and ground configurations. The flight configuration is shown in shaded form, and FIG. 2a self-evidently shows the reduction in span that occurs when the wing tip device 103 rotates to the ground configuration.

Figure 3:
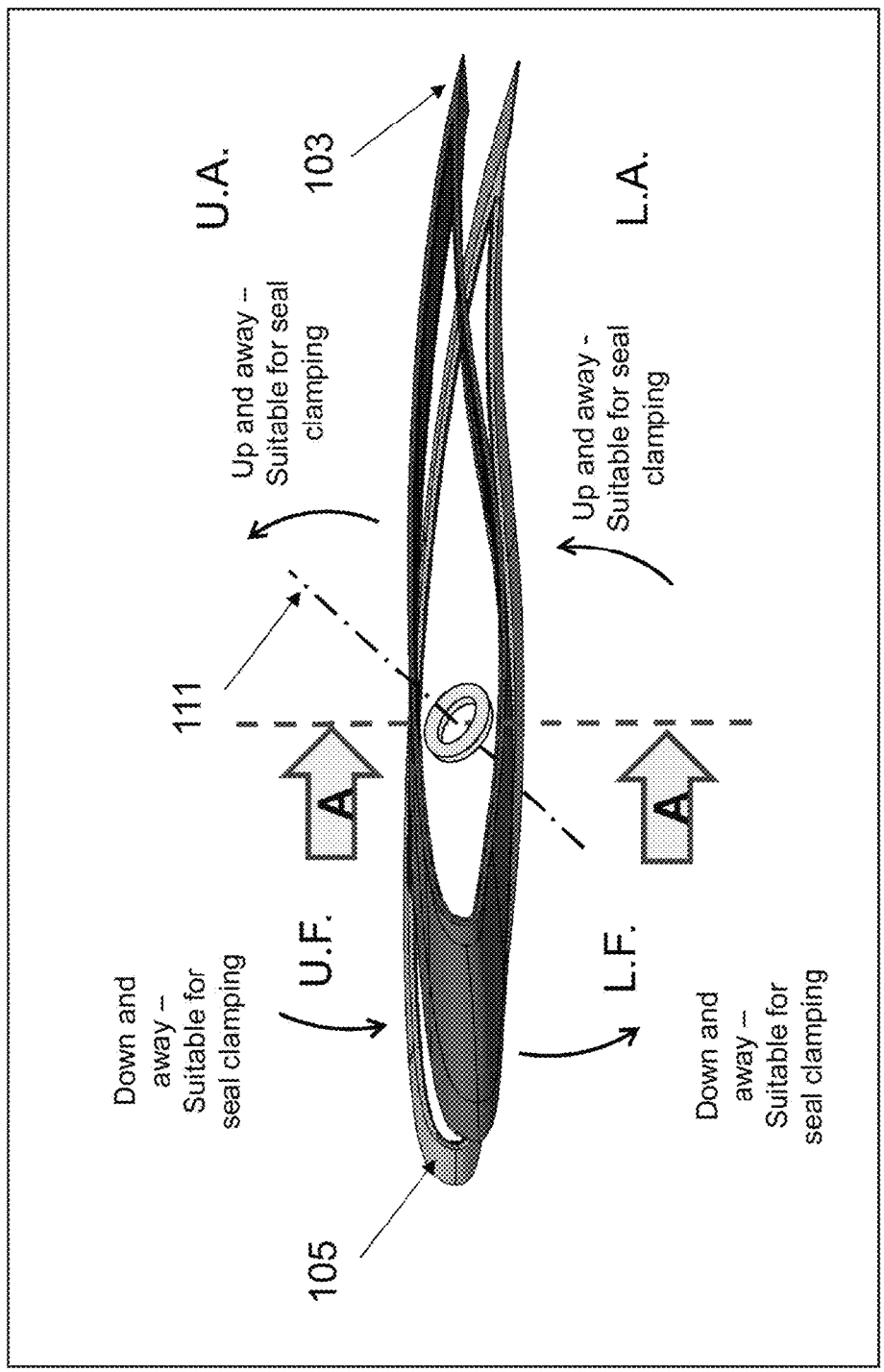
FIG. 3 is a cut-away end-on view of part of the fixed wing and wing tip device in FIGS. 2a and 2b.

FIG. 3 is a cut-away end-on view of part of the fixed wing and wing tip device in FIGS. 2a and 2b. The wing tip device 103 of the first embodiment is, in general terms, rotatable in a similar manner to that shown in FIGS. 1a-1b. In other words, the wing tip device 103 is rotatable about an axis 111 that is orientated normal to a primary oblique cut plane 113 (see FIG. 4) separating the outer end of the fixed wing 105 and the inner end of the wing tip device 103, and that axis is at an acute angle to all three mutually perpendicular axes X, Y and Z (i.e. chordwise, spanwise and vertical). The wing comprises a ring-shaped slew-bearing 112 for guiding rotation and reacting loads into the fixed wing.

The nature of the movement is also illustrated in FIG. 3, which shows the wing tip device being partially rotated towards the ground configuration. As the wing tip device 103 is rotated about the axis 111, the upper and lower surfaces that are fore of the axis, move downwards (labelled "Down and Away" in FIG. 3); whereas the upper and lower surface that are aft of the axis move upwards (labelled "Up and Away" in FIG. 3). The fixed wing/wing tip interface can thus be divided into four notional quadrants (upper-fore (UF), upper-aft (UA), lower-fore (LF) and lower-aft (LA))

The first embodiment of the invention has a particular layout of interfacing cut line 135 between the fixed wing and the wing tip device, as is described below with reference to FIGS. 4 to 13b. The first embodiment of the invention also has a particular construction of interface between the fixed wing and the wing tip device, as is described below with reference to FIGS. 14 to 16b.

The Interfacing Cut Line

Figure 4:
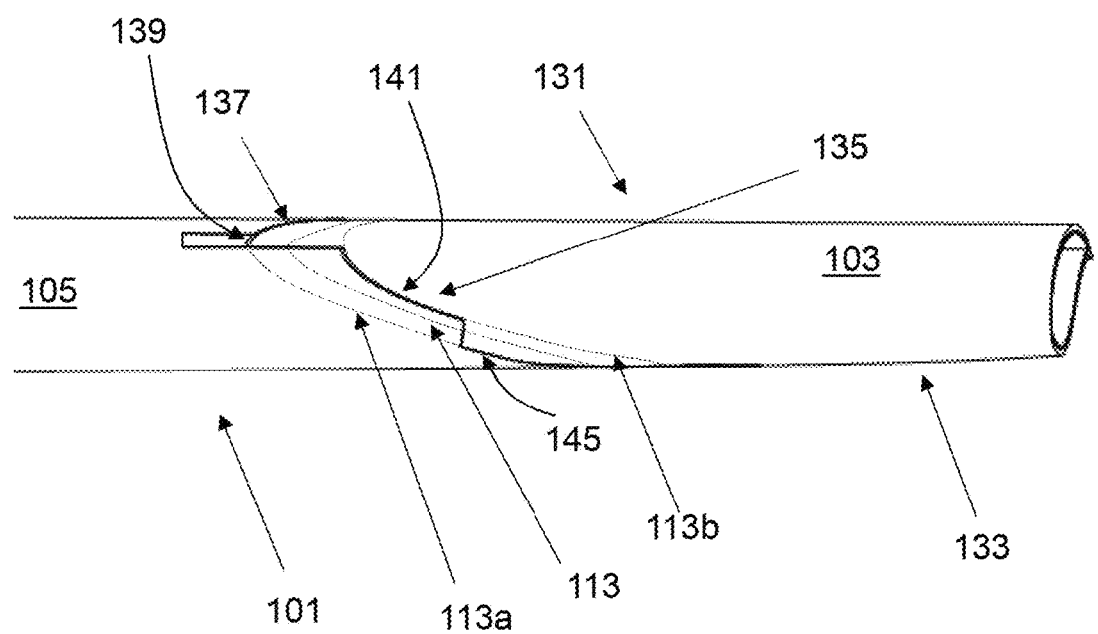
FIG. 4 is a frontal view of the wing in the vicinity of the fixed wing/wing tip device interface, showing the interfacing cut-lines and the cut planes.
Figure 5A:
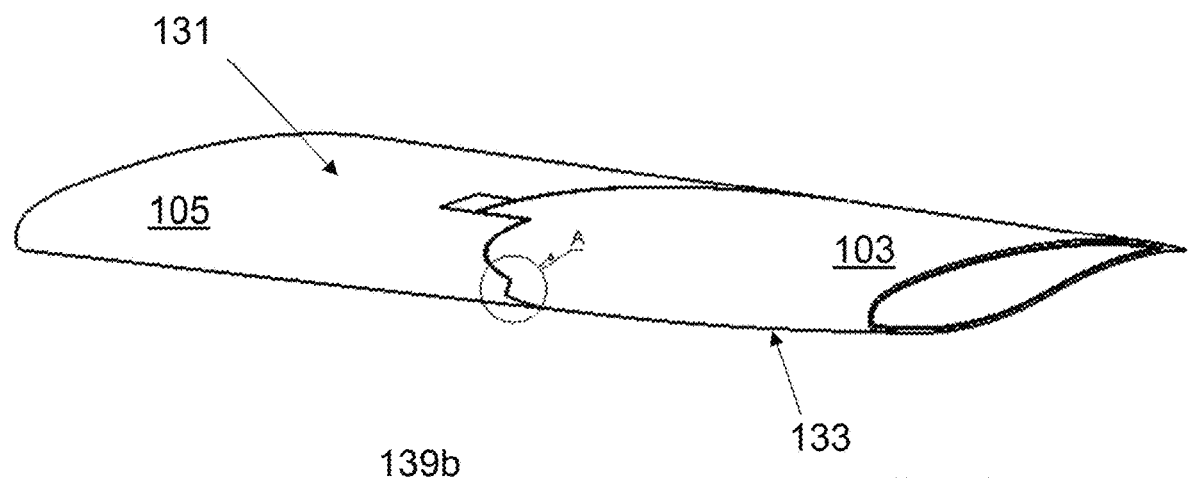
FIGS. 5A and 5B are perspective views of the part of the wing shown in FIG. 4, with a close up view of the part of the wing showing the interfacing cut line.
Figure 5B:
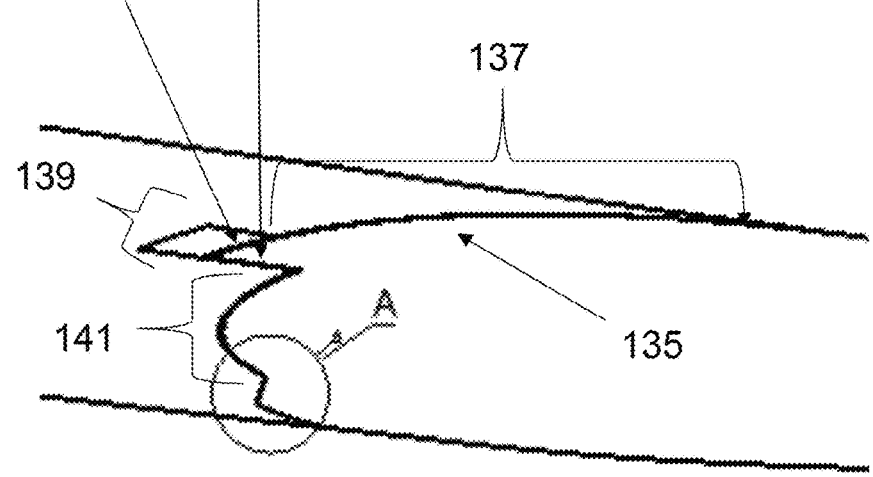
Figure 6:
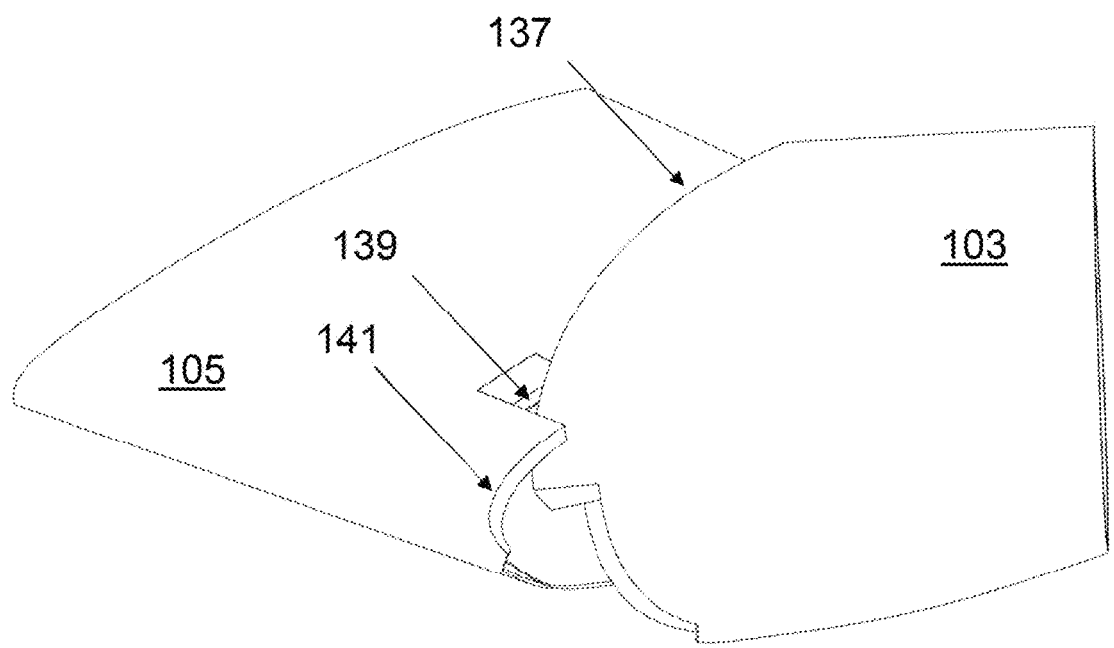
FIG. 6 is the wing of FIGS. 5A and 5B, but with the wing tip device having moved towards the ground configuration.

FIG. 4 is an above-frontal view of the wing 101 in the vicinity of the joint between the fixed wing 105 and wing tip device 103, FIGS. 5A and 5B are perspective views of this part of the wing with the wing tip device in the flight configuration and FIG. 6 is a perspective view of this part of the wing with the wing tip device moving towards the flight configuration. The wing 101 has an upper surface 131 and a lower surface 133. The fixed wing 105 and the wing tip device 103 are separated along the notional primary cut plane 113 (to which the axis of rotation is perpendicular see description of FIG. 3 above).

The primary cut plane 113 is indicated in FIG. 4 by the dashed-line where it intersects the wing, and the first and second offset, parallel, planes 113a, 113b (see below) are also indicated in FIG. 4 by the dashed-line where those planes intersects the wing respectively. As will become apparent from the description below, parts of an interfacing cut line extend within that plane, and are shown by the solid lines in FIG. 4.

Referring to FIGS. 4 to 6, the outer end of the fixed wing 105 and the inner end of the wing tip device 103 meet along an interfacing cut-line 135 that separates the outer surfaces of the fixed wing 105 and the wing tip device 103. The interfacing cut-line 135 is stepped, and is formed of a series of different lengths, as will now be described:

The interfacing cut line 135 comprises a first length 137 (see FIGS. 5A and 5B) extending from the trailing edge, over the upper-aft quadrant (UA) to the start of a transition section 139. The first length 137 of interfacing cut line lies in a plane 113a that is parallel to the primary cut plane 113, but it is offset in an inboard direction.

The interfacing cut line 135 also comprises a second length 141 extending from the leading edge, over the upper-fore quadrant (UF) to the other end of the transition section 139. As is most clearly shown in FIG. 4, this second length 141 of interfacing cut line also lies in a plane 113b that is parallel to the primary cut plane 113, but it is offset in an outboard direction (i.e. in the opposite direction to the other plane 113a).

It will be appreciated from above, that the first and second lengths 137, 141 thus both lie in oblique planes parallel to the primary cut plane 113, but in planes that are offset from that primary cut plane in opposite directions.

Between the first 137 and second lengths 141 is a transition section 139. The transition section 139 comprises a first section 139a that lies in the same plane 113a as the first length 137 and a second section 139b at which the interfacing cut jumps across from the first plane 113a to the second plane 113b. The transition section 139 thus transitions the interfacing cut line 135 from the first 137 to the second 141 lengths.

Figure 7:
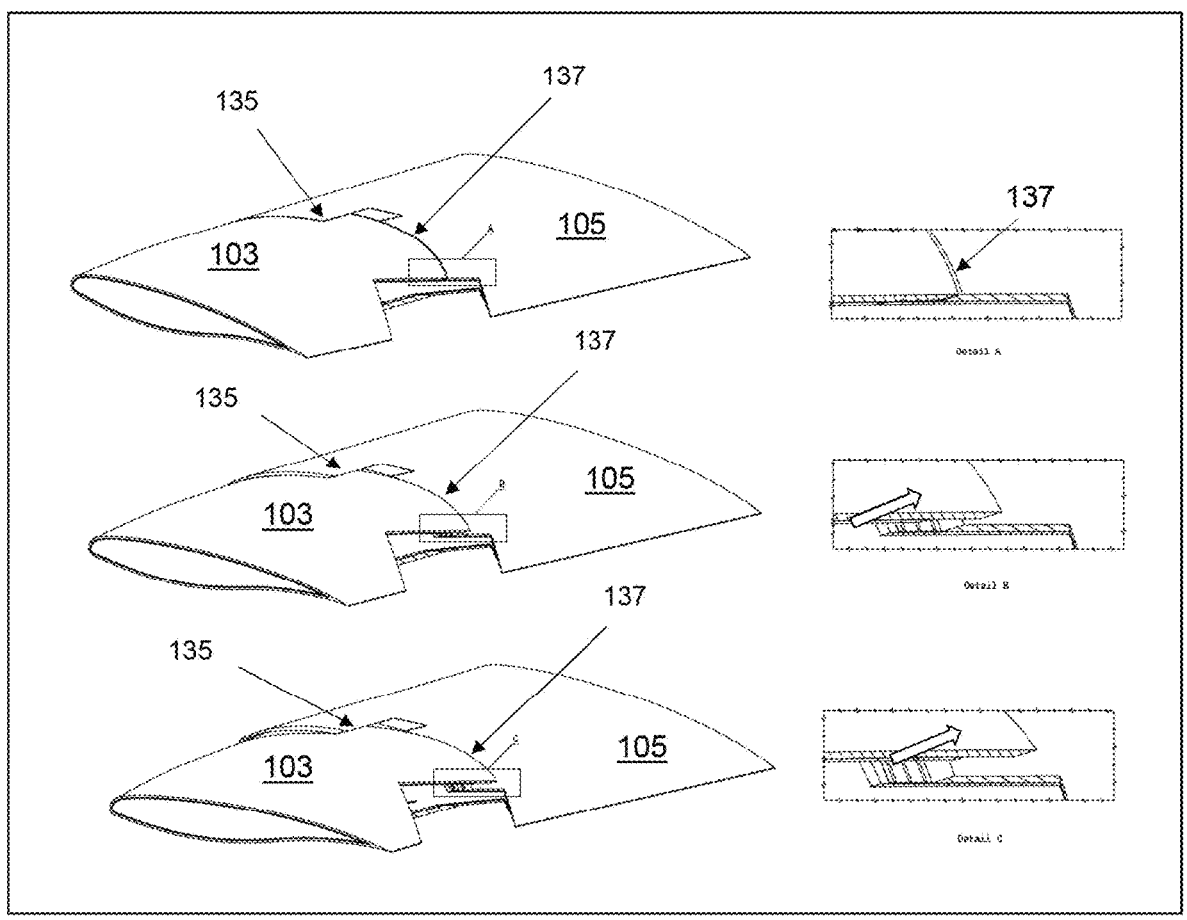
FIG. 7 shows the relative movement between the fixed wing and the wing tip device along a first length of the interfacing cut line, as the wing tip devices moves away from the flight configuration.
Figure 8:
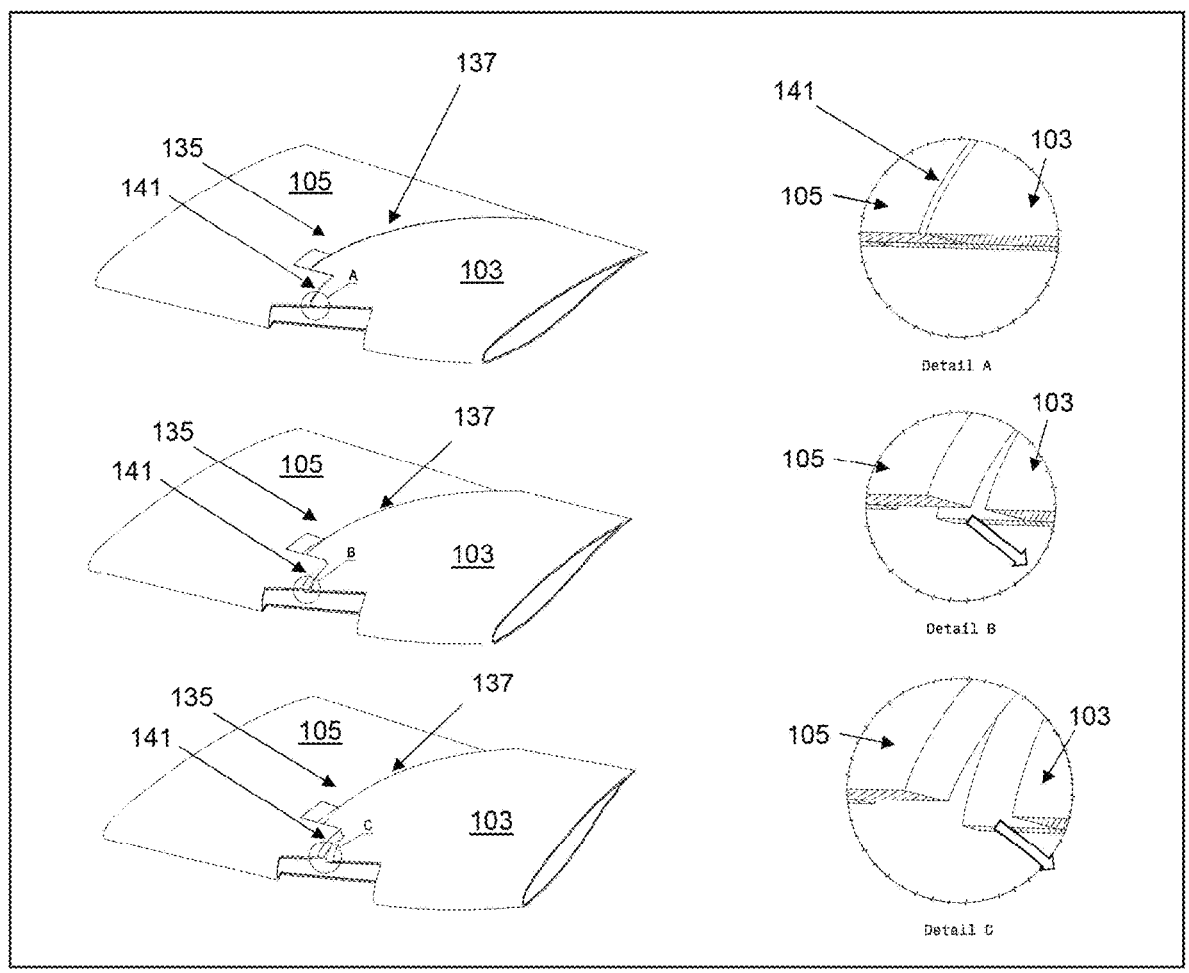
FIG. 8 shows the relative movement between the fixed wing and the wing tip device along a second length of the interfacing cut line, as the wing tip devices moves away from the flight configuration.

The interfacing cut line 135 is arranged such that when the wing tip device 103 rotates from the flight configuration to the ground configuration, specific types of relative movement occur between the outer end of the fixed wing 105 and the inner end of the wing tip device 103. This is most readily understood with reference to FIGS. 7 to 9. Referring first to FIGS. 7 and 8, these show close-up sectional views through part of the first length 137 and second length 141 respectively, as the wing tip device moves away from the flight configuration and towards the ground configuration.

As can be seen from the top image in FIG. 7, when the wing tip device is in the flight configuration, the wing tip and the fixed wing meet at the first length 137 of the interfacing cut line 135, which is cut in an oblique plane. This oblique plane is the inboard plane 113a and is parallel to the primary cut plane 113. As the wing tip device 103 rotates away from the flight configuration (see middle image) the wing tip device 103 separates away from the fixed wing 105. This separation is effectively a local translational movement (see large arrow in FIG. 7) and there is no sliding contact along the interface. As the wing tip device 103 continues to rotate away from the flight configuration (see bottom image) the inner end of the wing tip device 103 (along the first length 137) further separates away from the outer end of the fixed wing 105 under this local translation.

FIG. 8 shows the corresponding images as FIG. 7, but with the sectional view being taken through the second length 141 of the interfacing cut line 135. As can be seen from the top image in FIG. 8, when the wing tip device 103 is in the flight configuration, the wing tip and the fixed wing meet at the interfacing cut line 135, which is cut in an oblique plane. This oblique plane is the outboard plane 113b and is parallel to the primary cut plane 113 (but offset in the opposite direction to the inboard plane). As the wing tip device 103 rotates away from the flight configuration (see middle image) the inner end of the wing tip device 103 separates away from the fixed wing 105. This separation is effectively a local translational movement (see large arrow in the close-up views of FIG. 8) and there is no sliding contact along the interface. As the wing tip device 103 continues to rotate away from the flight configuration (see bottom image) the inner end of the wing tip device 103 further separates away from the outer end of the fixed wing 105 under this local translation. The translational movement shown in FIG. 8, is in the opposite direction to that shown in FIG. 7 because the respective interfacing cut lines 137, 141 are on opposite sides of the axis of rotation 111. In other words, the part of the wing tip device along the first length 137 of the interfacing cut line moves 'up and away', and the part of the wing tip device along the second length 141 of the interfacing cut line moves 'down and away' (see FIG. 3).

Figure 9:
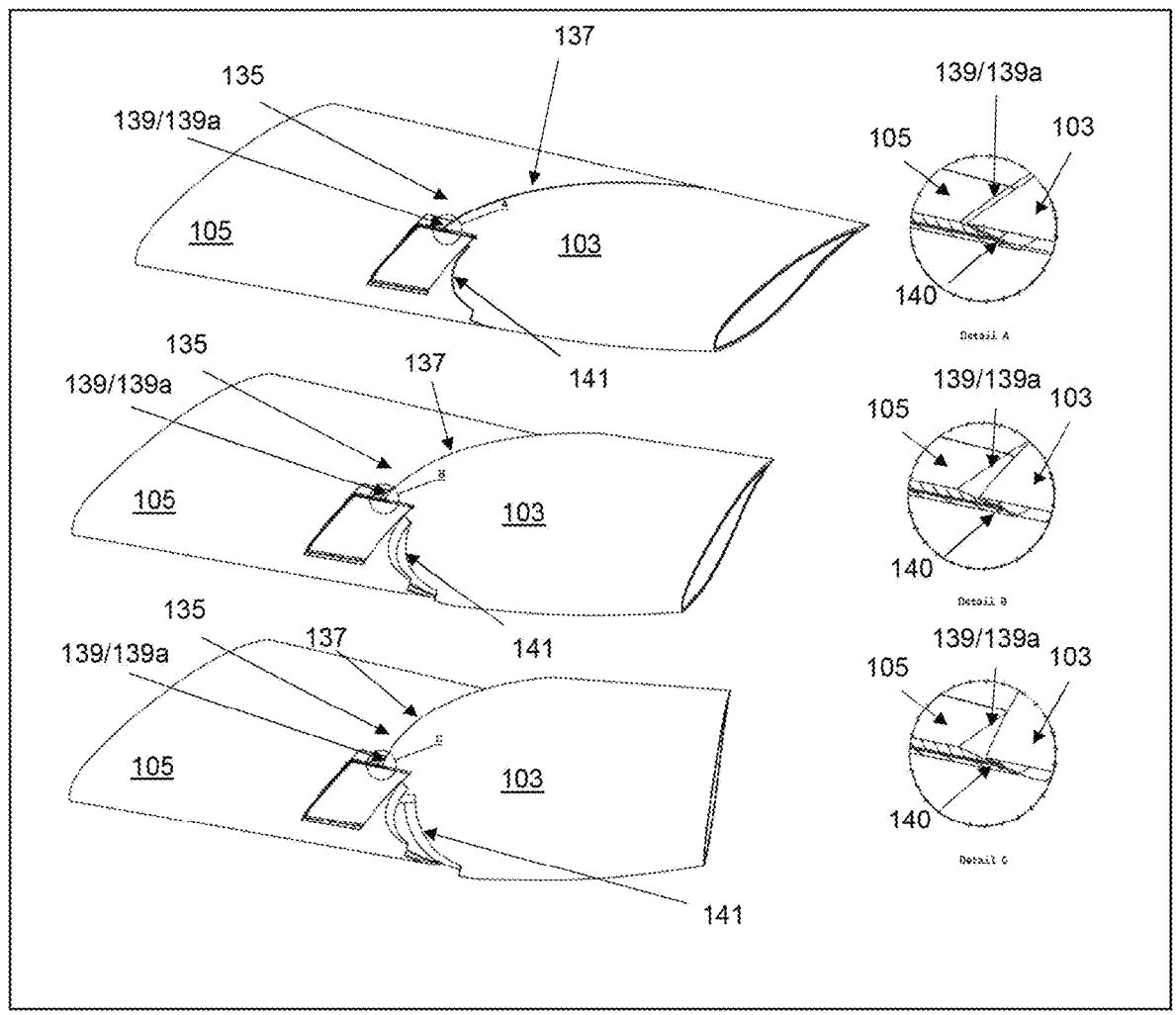
FIG. 9 shows the relative movement between the fixed wing and the wing tip device along a transition section of the interfacing cut line, as the wing tip devices moves away from the flight configuration.

FIG. 9 shows the corresponding images as FIGS. 7 and 8, but with the sectional view being taken through the first part 139a of the transition section 139 of the interfacing cut line (see rectangular cut-out in the left-hand images of FIG. 9). As can be seen from the top image in FIG. 9, the first section 139a of the transition section 139 lies in the same, inboard plane 113a, as the first length 137. However in contrast to the first length 137, the wing tip device does not separate away from the transition region as the wing tip device rotates. Instead, there is a moving point of sliding contact 140 between the fixed wing 105 and the wing tip device 103, which moves from aft-to-fore (and through the thickness of the wing skin) as the wing tip device 103 rotates towards the ground configuration.

The first section 139a of the transition section 139 extends to a fore-most location that reflects the fore-most location of the sliding contact point (e.g. at its position when the wing tip device 103 is in the ground configuration taking into account some leeway for further movement). At this point, it is necessary for the transition section 139 to move to the second length of the interfacing cut line 141. Accordingly, the second part 139b of the transition section 139 comprises a short length, in an outboard direction, that jumps from the inboard cut plane 113a, across the primary cut plane 113 and to the outboard cut plane 113b, to meet the second length 141. This second length 139b is not visible in FIG. 9 due to the sectional-cut, but can be seen in FIGS. 5A and 5B.

Figure 10:
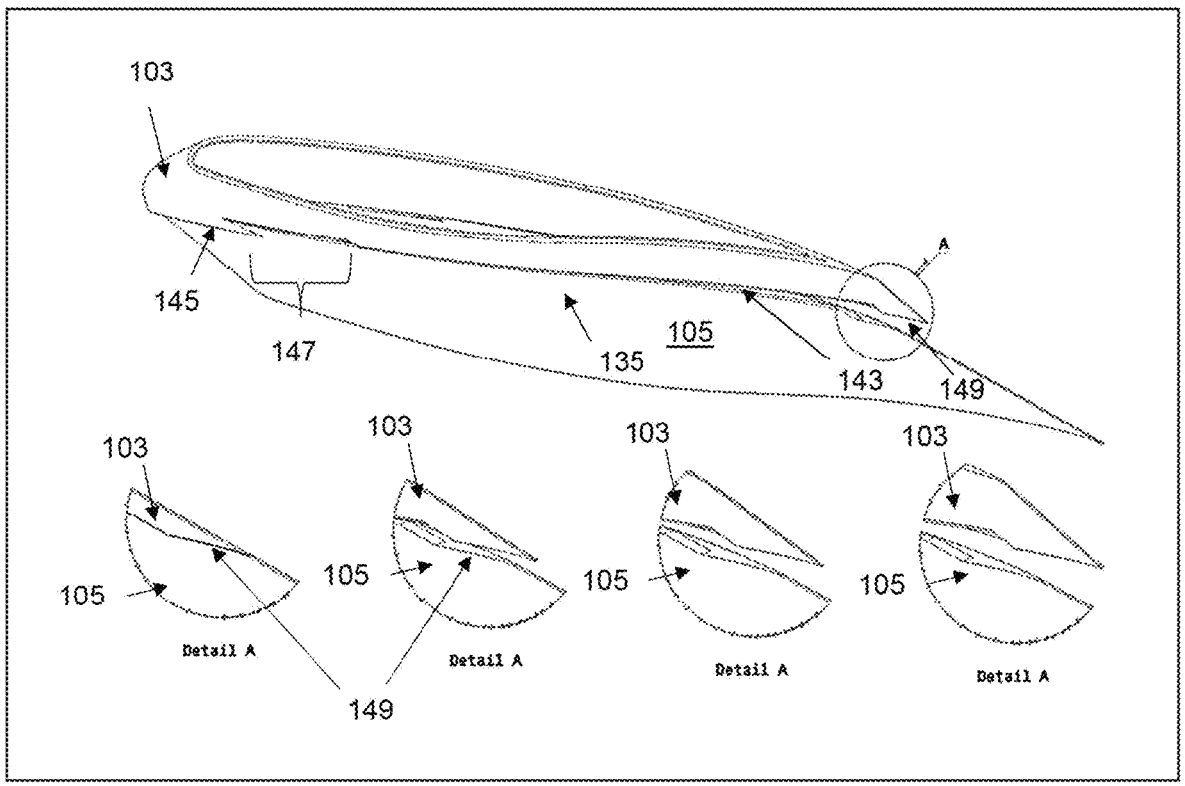
FIG. 10 shows the underside of the wing and the movement of a part of the interfacing cut line as the wing tip device rotates.

FIGS. 7 to 9 show primarily the upper surface of the wing 101. FIG. 10 is a perspective view showing the lower surface of the wing 101. As can be seen from FIG. 10, the interfacing cut line 135 comprise a third length 143 in the lower-aft (LA) quadrant, a fourth length 145 in the lower-fore (LF) quadrant, and a second transition section 147 linking the third and fourth lengths 143, 145. The third length 143 lies in the outboard plane 113b, whereas the fourth length lies in the parallel, but offset, inboard plane 113a.

In a similar manner to that described with reference to the upper surface shown in FIGS. 7 to 9, the third and fourth lengths 143, 145 separate from the fixed wing 105 as the wing tip device 103 moves from the flight configuration to the ground configuration. Thus, the surfaces at the interface undergo a local translational movement away from one another. In contrast, along the transition section 147 the fixed wing 105 and the wing tip device 103 contact each other along a sliding contact that moves fore-aft as the wing tip rotates.

On the lower surface 133 of the wing, the interfacing cut line 135 also comprises a further transition region 149 at the trailing edge. This further (third) transition section 149 links from the third length to the first length and thus traverses from the outboard cut plane 113b on which the third length lies, to the inboard cut plane 113a on which the first length lies.

Since this further transition section 149 is relatively far away from the axis of rotation 111, and since the curvature of the trailing edge is very tight, there tends to be negligible sliding contact at this further transition region 149. Instead, this third transition section 149 undergoes a separation, as shown in the close-up views in FIG. 10 (which illustrate the transition section 149 in four successive stages of movement way from the flight configuration).

Figure 11:
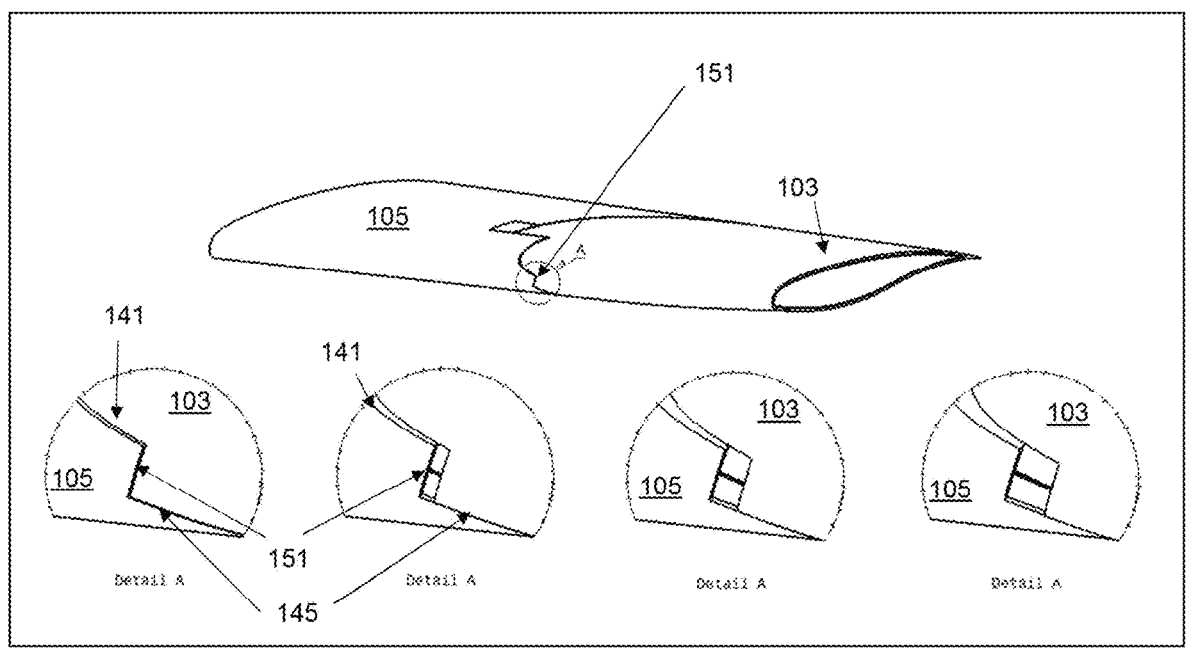
FIG. 11 shows the relative movement between the fixed wing and the wing tip device along a further transition section of the interfacing cut line, as the wing tip devices moves away from the flight configuration.

Referring now to FIG. 11, the interfacing cut line 135 also comprises a further (fourth) transition region 151 at the leading edge of the wing. Like the third transition section 149 described above, this fourth transition section 151 is relatively far away from the axis of rotation 111. Since the curvature of the leading edge is tight, there tends to be negligible sliding contact at this transition region. Instead, this further (fourth) transition section 151 undergoes a separation, as shown in the close-up views in FIG. 11 (which show the transition section 151 in four successive stages of movement away from the flight configuration).

It will be appreciated from the above-description that the interfacing cut line 135 is thus divided into 4 notional lengths 137, 141, 143, 145 each separated by transition sections 139, 147, 149, 151. Each of the lengths 137, 141, 143, 145 of the interfacing cut line is adjacent, but linked by a transition section 139, 147, 149, 151 to another length 137, 141, 143, 145 that is offset in the opposing cut plane 113a, 113b. The pairs of lengths of cut line that are on opposing sides of the axis of rotation (i.e. the first and second lengths 137, 141, and the third and fourth lengths 143, 145) are each, respectively, split by a transition region 139, 147 in which there is a sliding contact as the wing tip device 103 rotates between the flight and the ground configurations. In contrast, the pairs of lengths 137, 141, 143, 145 of the interfacing cut line 135 undergo a translational separating movement as the wing tip device 103 rotates between the flight and the ground configurations.

The above-mentioned arrangement has been found to be especially beneficial with respect to the sealing between the fixed wing 105 and the wing tip device 103. More specifically, it enables the use of a compression seal (i.e. an arrangement that forms a seal under a compressive movement) along the first to fourth lengths 137, 141, 143, 145 of the interfacing cut line 135, but a sliding seal only along the first and second transition regions 139, 147. The compression seal is arranged to seal under the action of the wing tip device 103 and the fixed wing 105 coming together under a local translational movement. Such a compression seal tends to provide an effective seal, yet is not subject to particularly high wear because there tends not to be any relative sliding across the seal. The sliding seal provides a seal when the wing tip device 103 is in the flight configuration, yet it is designed to withstand the wear from the sliding contact that moves along the seal as the wing tip device 103 rotates. By offsetting the lengths 137, 141, 143, 145 of the interfacing cut line 135 in opposing planes 113a, 113b, either side of the axis of rotation 111, the first embodiment of the invention maximises the length of the compression seal, but minimises the length of the sliding seals.

Figure 12:
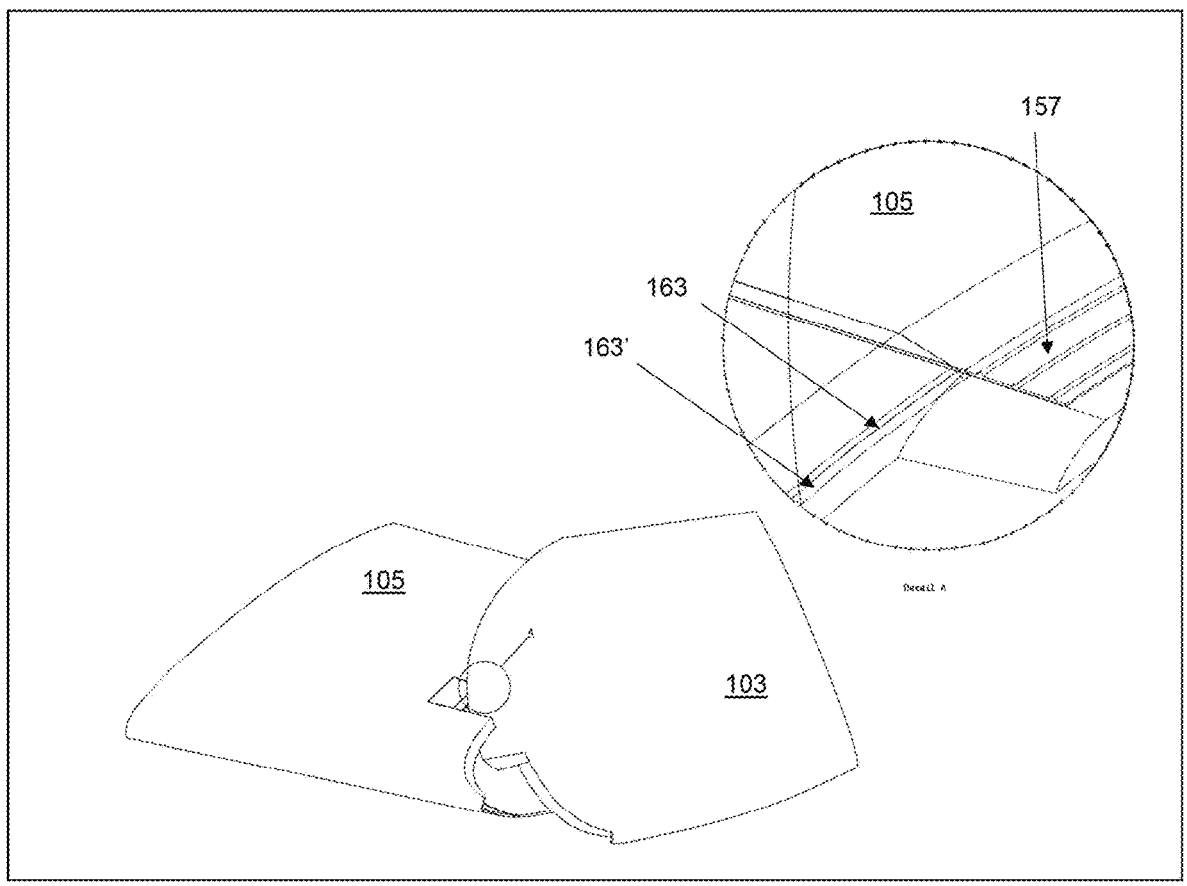
FIG. 12 shows the perspective view of the interface showing the sealing arrangement along part of the interfacing cut line.
Figure 13:
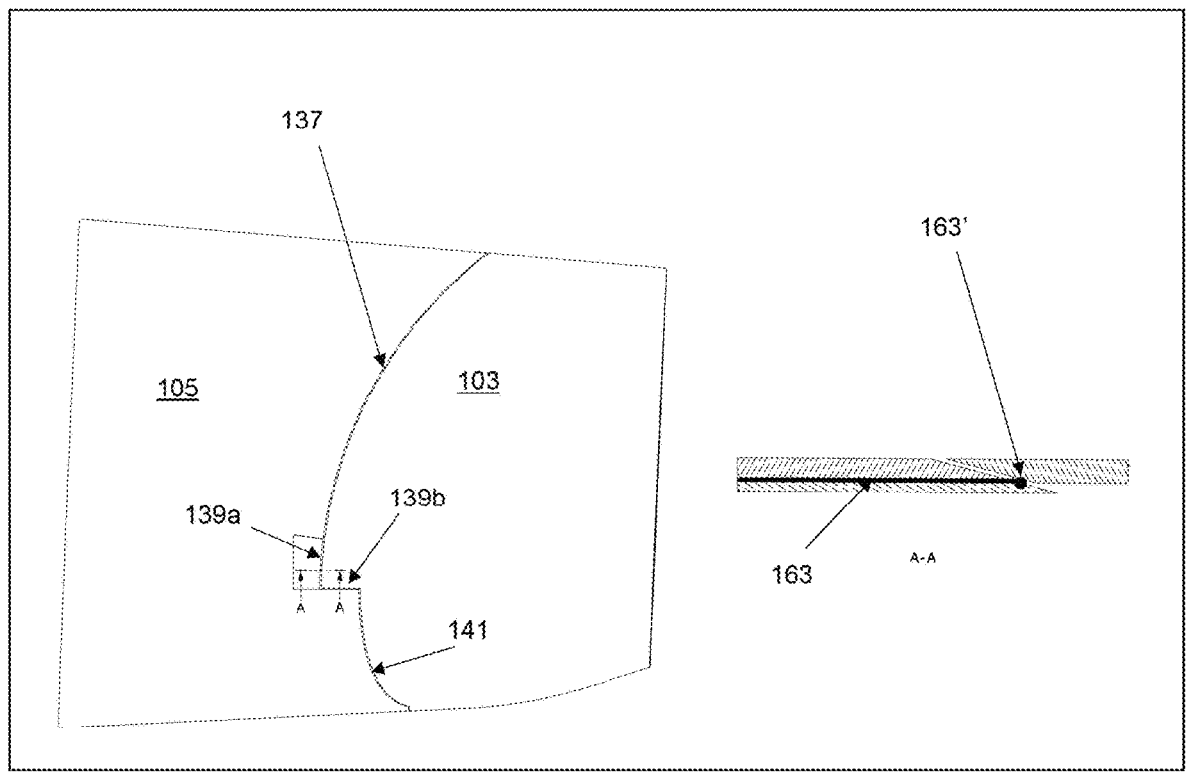
FIG. 13 shows part of the transition section on the upper surface of the wing.

Part of the sealing arrangement in the first embodiment of the invention is shown in FIG. 12. The compression seal extends in a wide strip along the first length. It is formed from a resiliently deformable rubber strip 157, having three semi-circular ridges along its length, that are compressed by the coming together of the wing tip device and the fixed wing (along the first length of interfacing cut line). The sliding seal 163 extends over the first part of the first transition section. It is formed from a thick rubber bead 163' running along the length of this section. The right-hand part of FIG. 13 shows the sliding seal in cross-section along A-A of the left-hand part of FIG. 13.

The sealing arrangement in FIGS. 6 to 13 is largely schematic. Further specific details of the sealing arrangement are discussed below with respect to FIGS. 14 to 16b.

The Construction of the Interface

As mentioned above, the first embodiment of the invention has a particular construction of interface between the fixed wing and the wing tip device. This will now be described below with reference to FIGS. 14 to 16b.

Figure 14:
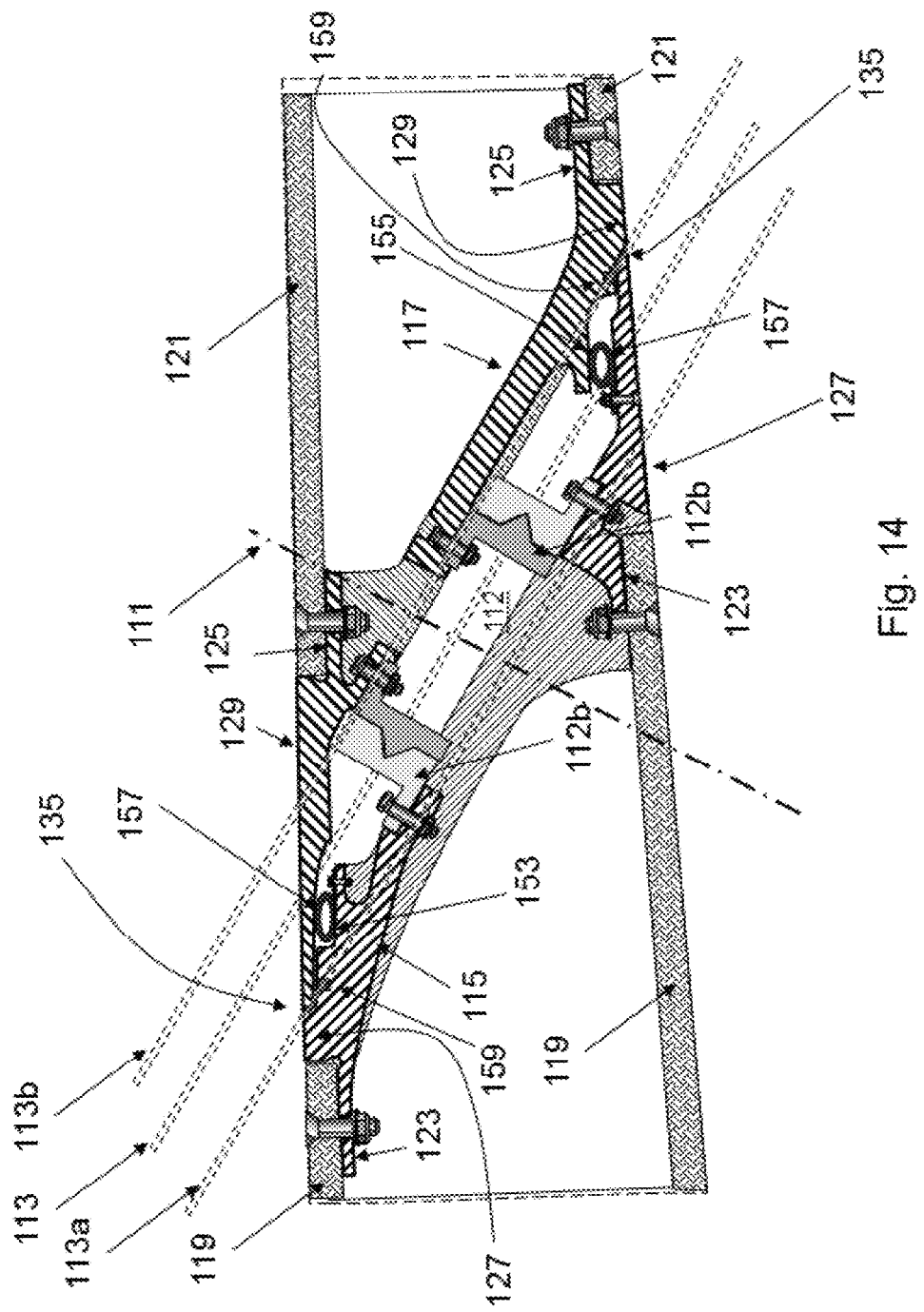
FIG. 14 is a cut-away view along A-A of FIG. 3, with the wing tip device in the flight configuration.

FIG. 14 is a cut-away view along A-A of FIG. 3, with the wing tip device 103 in the flight configuration. The outer end of the fixed wing 105 terminates at an outer rib 115. The inner end of the wing tip device 103 terminates at an inner rib 117. When the wing tip device 103 is in the flight configuration (i.e. as shown in FIG. 14) the outer 115 and inner 117 ribs are located on opposing sides of the interfacing cut line 135 between the fixed wing 105 and the wing tip device 103. It will be appreciated that reference to 'outer' and 'inner' ribs is made relative to their location on their respective structure (i.e. relative to the fixed wing and wing tip device). As such the 'inner' rib is located beyond the 'outer' rib in an absolute frame of reference.

At the section shown, the interfacing cut line 135 on the upper surface lies in the inboard cut plane 113a and the interfacing cut line 135 on the lower surface lies in the outboard cut plane 113b (see description above with reference to the "Interfacing cut line").

The wing includes a slew-ring bearing 112 linking the outer rib 115 to the inner rib 117. The rotational axis of the slew ring is coaxial with the axis of rotation 111. The rotational movement of the wing tip device is effected by an actuator (not shown).

The fixed wing 105 comprises a fixed wing-skin 119 forming the outer surface of the fixed wing, and the wing tip device comprises a wing tip device-skin 121 forming the outer surface of the wing tip device 103. In a manner akin to known rib/skin assemblies, the fixed wing-skin 119 is fastened to rib feet 123 on the outer rib 115 and the wing tip device skin 121 is fastener to rib feet 125 on the inner rib 117. An oblique webbing (only part of which is visible in FIGS. 14 to 16b) links the upper and lower rib feet, and attaches to the respective races 112a, 112b of the slew ring 112.

In contrast to known rib/skin assemblies, the fixed wing-skin 119 terminates before (i.e. inwardly of) the interface 135. The outer rib 115 comprises a surface-forming portion 127, that creates an extension of the fixed wing-skin 119 towards the interface 135. Likewise, the wing tip device-skin 121 terminates outwardly of the interface 135. The inner rib 117 comprises a surface-forming portion 129, that creates an extension of the wing tip device-skin 121 towards the interface 135.

Providing an arrangement in which the skins (i.e. the fixed wing-skin 119 and the wing tip device-skin 121) both terminate before the interface, enables the wing surface in the vicinity of the interface to instead be provided by the surface-forming portions 127, 129 of the ribs 115, 117. This has been found to be advantageous because it enables the tolerances at the interface to be more readily, and/or more accurately, controlled. For example, the surface-forming portions need not necessarily be of the same material or construction as the skin. This may facilitate tighter control of tolerances at the interface 135.

In the first embodiment of the invention, this is exemplified by the use of composite skins 119, 121 and metallic ribs 115, 117. If the composite skins were to extend up to the interface, it would be hard to ensure the sufficient tolerances are achieved because composite is difficult to machine and/or deflect to the required shape. In contrast, by providing metallic surface forming portions 129, 127 the outer surface layer can be machined to the correct tolerance (described in more detail with respect to FIG. 18). In addition, at least part of the surface forming portions 127, 129 can be created thinner than the composite skins, which tends to make it easier to avoid the outer end of the fixed wing 105 and the inner end of the wing tip device fouling on each other during rotation. In this respect, it will be noted that the surface forming portions 127, 129 on one side of the interface 135 are thinned as they approach the interface 135. The thinned region of the outer rib 115 overlaps the inner rib 117 at the interface on the lower surface of the wing, and the thinned region of the inner rib 117, overlaps the outer rib 115 at the interface on the upper surface of the wing.

The outer and inner rib arrangement described above also has advantages with respect to how the ribs may be manufactured. This aspect is described separately below—see "Manufacture of the inner and outer ribs".

Sealing Arrangement

The above-mentioned ribs provide an improved structure on which a seal can be provided. Specifically, each rib comprises a secondary surface for supporting a compression seal. On the outer rib 115, the secondary surface 153 is below the outer surface of the wing but extends in a direction substantially parallel to the outer surface such that it under-laps the surface-forming portion 129 on the opposing rib 117. Likewise, on the inner rib 117, the secondary surface 155 is below the outer surface of the wing but extends in a direction substantially parallel to the outer surface such that it under-laps the surface-forming portion 127 on the opposing rib 115. In the first embodiment of the invention, the secondary surfaces extend substantially up to the primary cut plane 113.

As a result of the local translational movement that occurs along the first to fourth lengths of the interfacing cut line (upon rotation of the wing tip device (see description above)), a rubber element 157 is compressed between the underside of the surface-forming portion 127, 129 of one rib, and the secondary surface 153, 155 of the other rib, when the wing tip device is brought into the flight configuration. This compression seal acts to inhibit leakage flow from the lower to upper surfaces of the wing. The first embodiment of the invention also comprises a secondary noise seal 159 in the form of an embedded rubber strip in one of the ribs, directly below the interface 135.

Figure 15B:
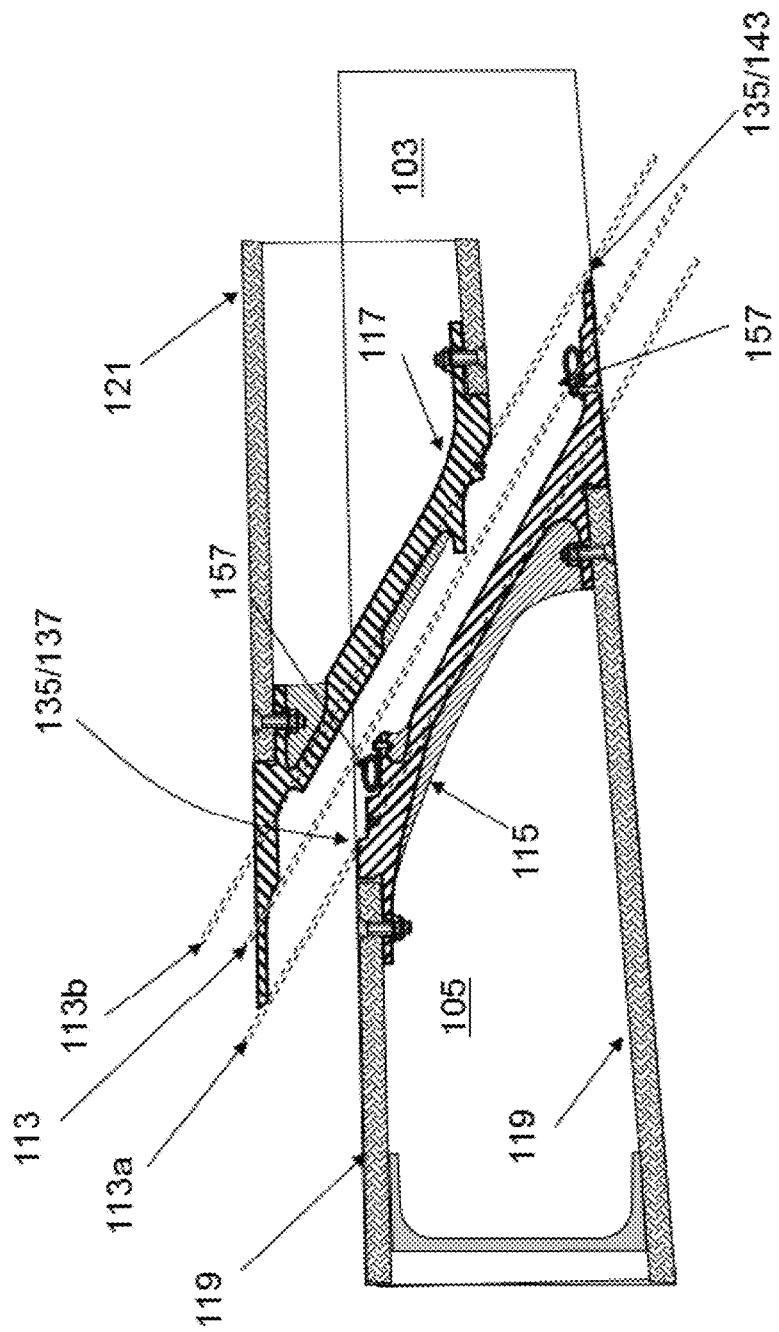
FIG. 15b is the cut-away view aft of section A-A of FIG. 3, with the wing tip device moving towards the ground configuration.

FIGS. 15a and 15b show the positions of the fixed wing and wing tip device when the wing tip device is in the flight configuration (FIG. 15a) and when it has moved towards the ground configuration (FIG. 15b). The view in FIGS. 15a and 15b is looking aft along a section that is aft of section A-A of FIG. 3. Thus, the interfacing cut line on the upper surface is the first length 137 and the interfacing cut line on the lower surface is the third length 143. Upon rotation, the wing tip device 103 is rotated about the axis 111 (which is perpendicular to the primary cut plane 113). As shown in FIG. 15b the aft portion of the wing tip device 103 moves upwardly thereby lifting the inner rib 117 away from the compression seal 157. In the reverse of this motion (as the wing tip device moves to the ground configuration) the compression seal 157 is (re)compressed thereby re-sealing the joint between the fixed wing and wing tip device.

Figure 16A:
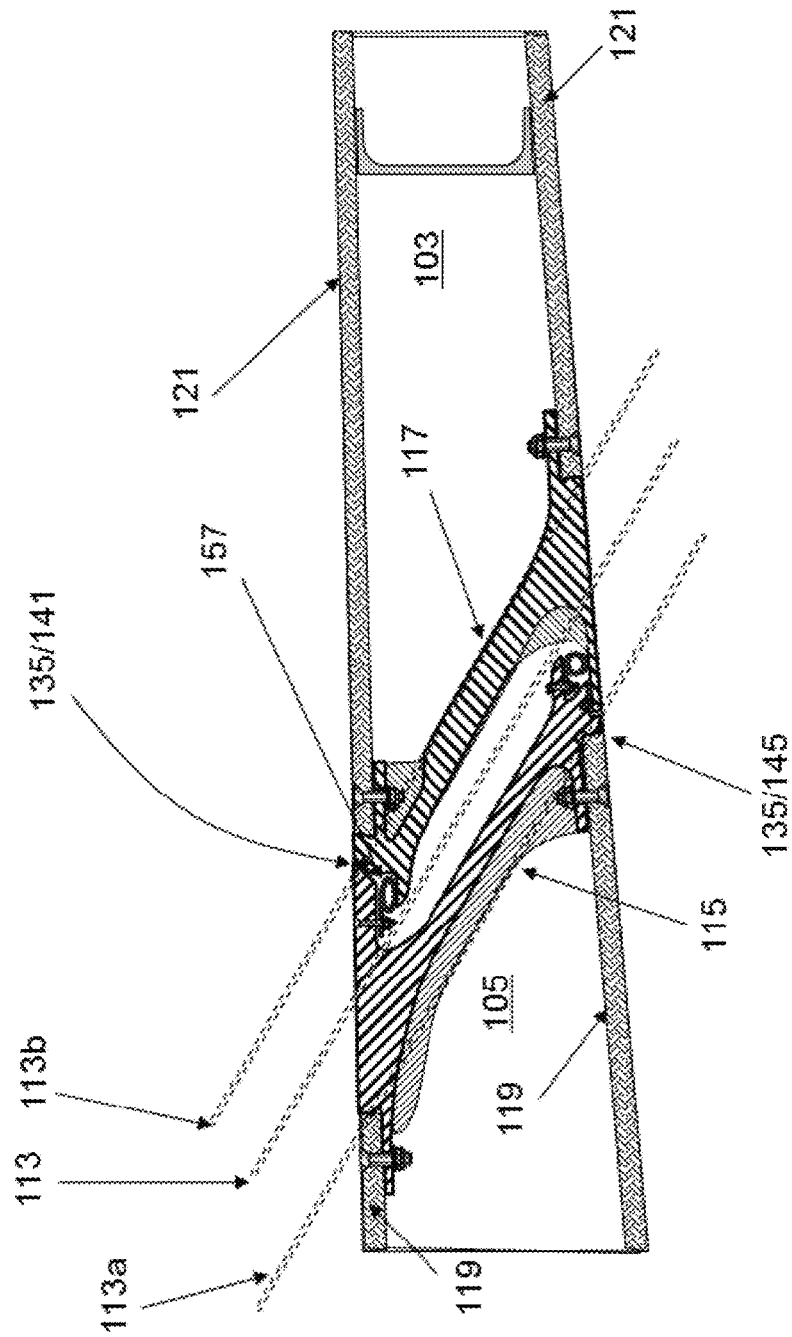
FIG. 16a is a cut-away view fore of section A-A of FIG. 3, with the wing tip device in the flight configuration.
Figure 16B:
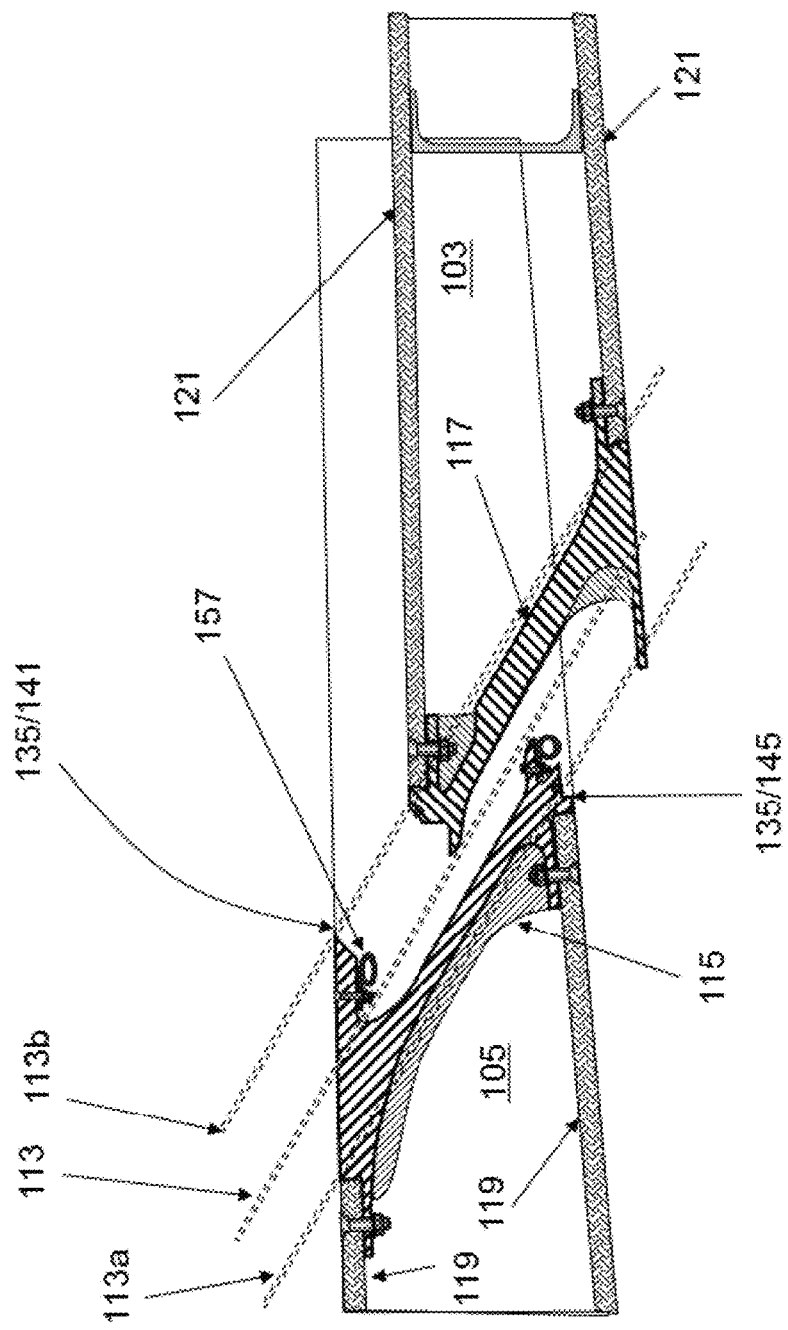
FIG. 16b is the cut-away view fore of section A-A of FIG. 3, with the wing tip device moving towards the ground configuration.

FIGS. 16a and 16b show the positions of the fixed wing and wing tip device when the wing tip device is in the flight configuration (FIG. 16a) and when it has moved towards the ground configuration (FIG. 16b). The view in FIGS. 16a and 16b is looking aft along a section that is fore of section A-A of FIG. 3. Thus, the interfacing cut line on the upper surface is the second length 141 and the interfacing cut line on the lower surface is the fourth length 145. Upon rotation, the wing tip device 103 is rotated about the axis 111 (which is perpendicular to the primary cut plane 113). As shown in FIG. 16b the fore portion of the wing tip device 103 moves downwardly thereby moving the inner rib 117 away from the compression seal 157. In the reverse of this motion (as the wing tip device moves back to the flight configuration) the compression seal 157 is (re)compressed thereby re-sealing the joint between the fixed wing and wing tip device.

Figure 17:
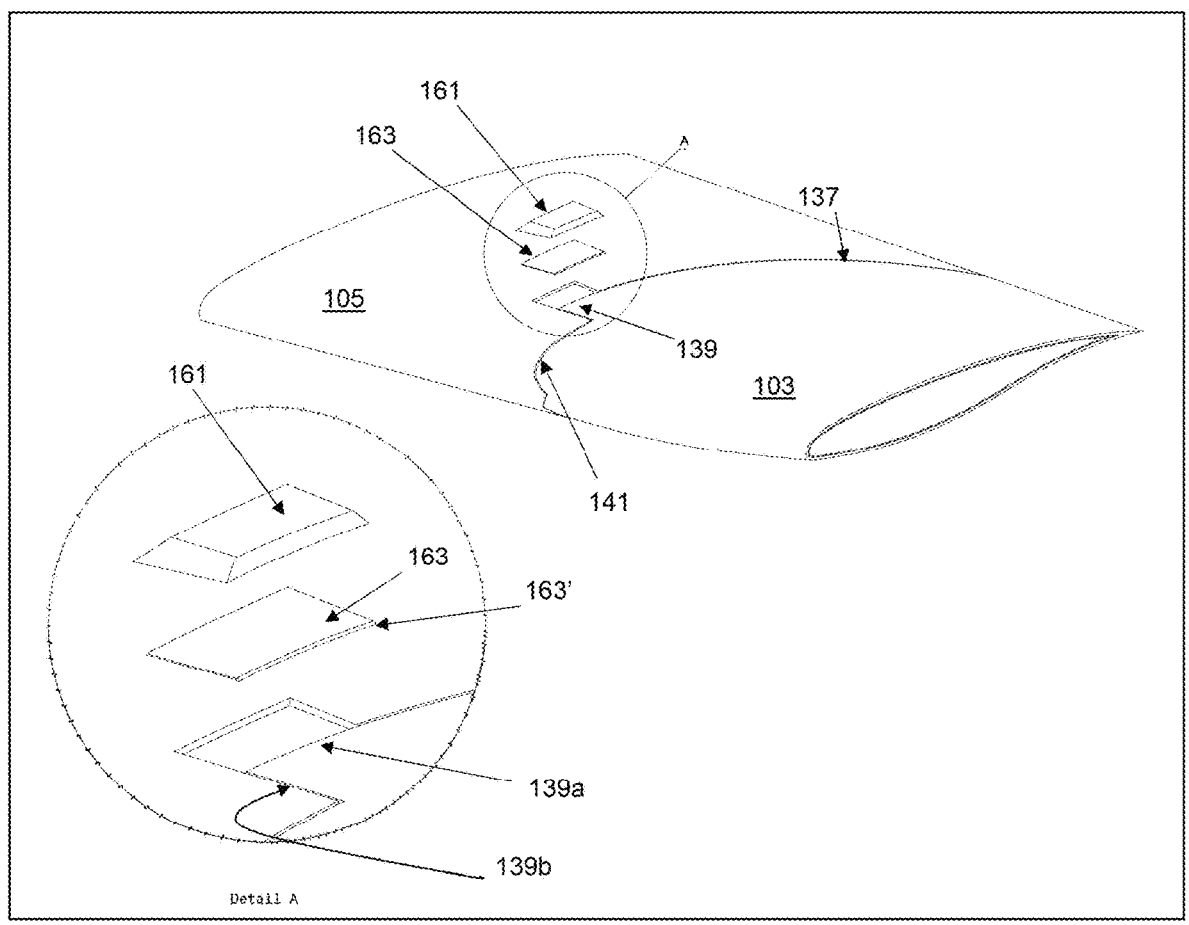
FIG. 17 shows an inspection panel for accessing the seal in the transition section

FIG. 17 is a perspective view of the wing in the first embodiment of the invention, showing an inspection panel and the sliding seal in exploded view. In the first embodiment, the region adjacent to the first transition section 139 includes the inspection panel 161. The inspection panel is in the form of a panel 161, that typically forms a surface with the surrounding part of the outer wing skin. The inspection panel 161 is, however, removable to enable the transition section 139 to be accessed (as shown in the exploded view of FIG. 17). More specifically the inspection panel 161 enables the sliding seal 163 to be inspected and replaced if necessary, without requiring a wider dismantling of the wing skin. It has been recognised that in the transition region there may be relatively high wear, so a dedicated means of facilitating inspection is beneficial. a corresponding inspection panel (not shown) is associated with the second transition section 147 on the lower surface of the wing.

Manufacture of the Inner and Outer Ribs

FIG. 18 show a schematic of how the inner and outer ribs 117, 115 in the first embodiment of the invention are manufactured. The ribs are initially rough machined from metallic forgings (not shown). The rough machined ribs are then partially precision machined, including creating the interfacing cut line 135 by cutting the ribs in the first and second offset cut planes 113a, 113b as required. The ribs are then brought together. The partially-precision machined ribs 117, 115 are located adjacent one another in a jig 165 that recreates their relative positions for when the wing tip device is in the flight configuration. The ribs and this jig are shown in FIG. 18.

Since the ribs are single piece metallic forgings, it is possible to machine the surface-forming portions with the tow ribs in situ. More specifically, by holding the ribs in their correct relative positions for flight, it is possible to precision machine the surface-forming portions to the precise outer mould line (OML) required. FIG. 18 illustrates the machining tool 167 machining the surface forming portions to create the correct (substantially continuous and seamless) OML across the interface. The ribs can then be disassembled from the jig, with confidence that once reassembled as part of the aircraft wing, the correct OML will be achieved when the wing tip device is in the flight configuration.

Other Embodiments of the Invention

FIGS. 19a-19d show a perspective view of a joint between a fixed wing and a wing tip device, according to a second embodiment of the invention. The second embodiment is identical to the first embodiment except for the features described below. Features in the second embodiment of the invention that correspond to similar features in the first embodiment of the invention, are shown with the same reference numerals as in the first embodiment, but with the use of the prefix '2' instead of '1'.

Figure 19A:
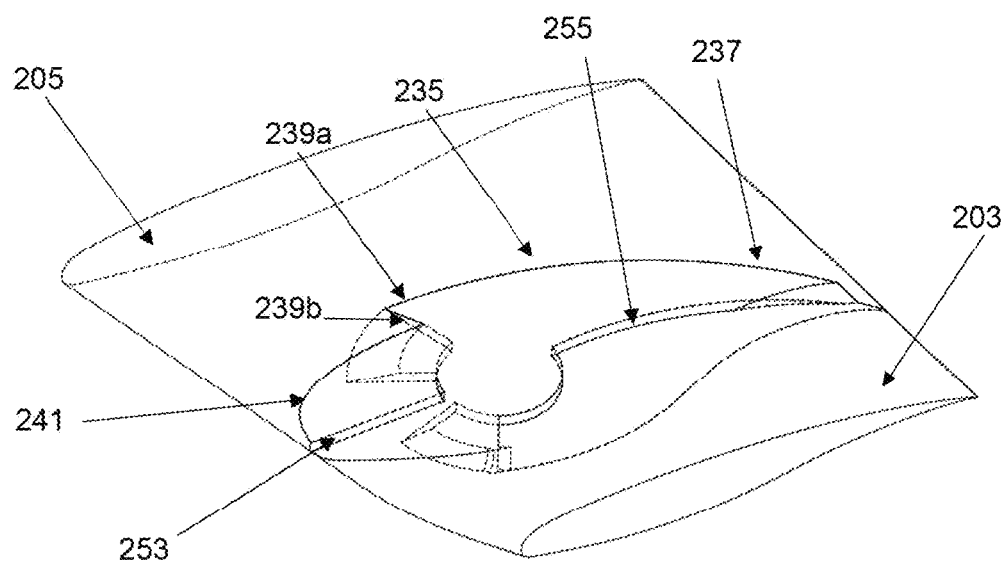
FIG. 19a to 19d show part of a wing on an aircraft according to a second embodiment.
Figure 19B:
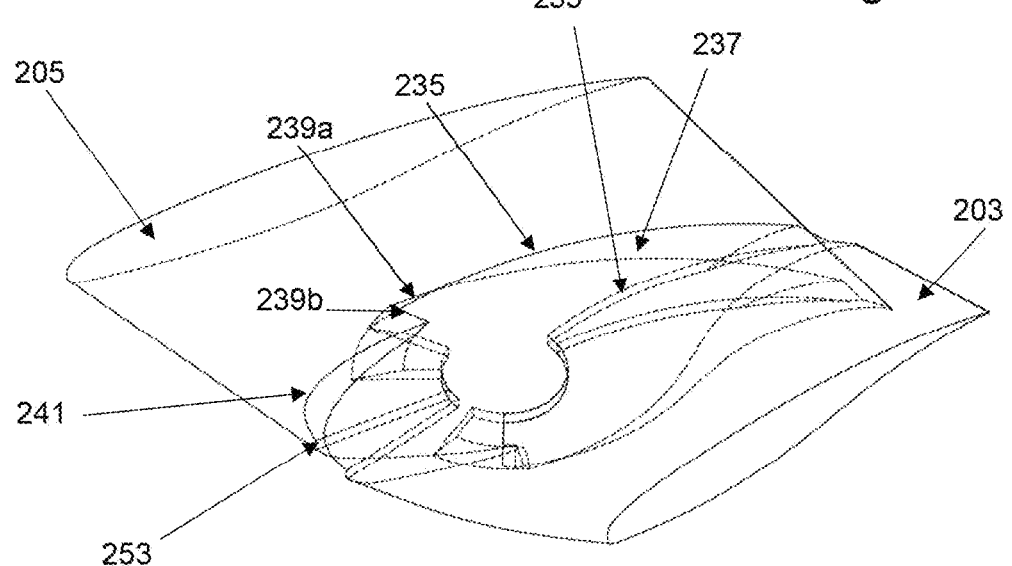
Figure 19C:
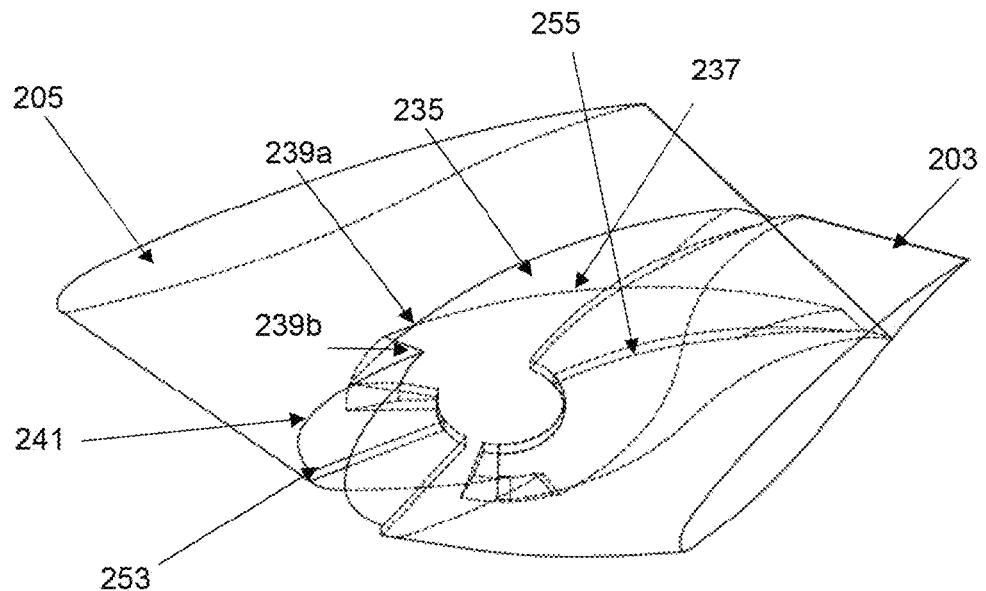
Figure 19D:
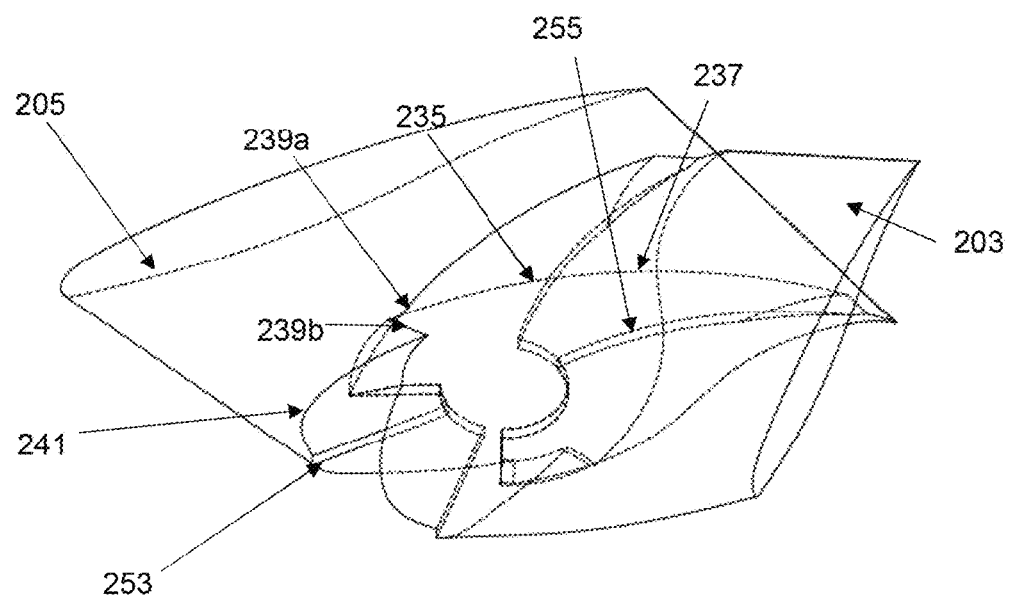

The wing tip device 203 is rotatably mounted on the outer end of the fixed wing 205. The wing tip device is separated from the fixed wing 205 along a notional oblique cut plane (not explicitly illustrated in FIGS. 19a-d) and is rotatable about an axis (not shown) that is orientated perpendicular to that cut plane. The wing tip device 203 is moveable around the axis between the flight configuration (FIG. 19a) and the ground configuration (FIG. 19d).

In the flight configuration, the outer end of the fixed wing 205 and the inner end of the wing tip device 203 meet along an interfacing cut line 235, which is itself formed from four lengths in the upper aft (UA), upper-fore (UF), lower-aft (LA) and lower-fore (LF) quadrants respectively of the aerofoil. Only the first and second lengths 237 and 241 are visible in FIGS. 19a-19d.

The first length 237 is formed by a cut through the outer surface of the wing in an inboard plane, parallel to the primary cut plane, but located inboard thereof. The second length 237 is formed by a cut through the outer surface of the wing in an outboard plane, parallel to the primary cut plane, but located outboard thereof. The first and second lengths 237, 241 are joined by a transition section 239 (formed itself by two section 239a (which lies in the inboard cut plane) and 239b (which moves directly from the inboard to the outboard cut plane)). As the wing tip device rotates away from the flight configuration, towards the ground configuration, the wing tip device separates ('upwardly') away from the outer end of the fixed wing along the first length 237 of the interfacing cut line 235 and the wing tip device separates ('downwardly') away from the outer end of the fixed wing along the second length 241 of the interfacing cut line 235. In the transition section 239 there is a sliding contact, that moves fore-aft along section 239a as the wing tip rotates along a sliding seal.

The above-mentioned features broadly reflect those in the first embodiment of the invention. In the second embodiment however, the interfacing cut is deeper and instead of providing a compression seal on a secondary surface 153, 155, that runs parallel to the outer surface of the wing, a secondary surface 253, 255 is instead provided (on the fixed wing 205) in a vertical plane running through the mid-chord depth. Opposing surfaces on the wing tip device are also provided, and those surfaces are shown in dotted lines in FIGS. 19b-19d. As can be seen in those figures, these opposing surfaces progressively separate from the secondary surfaces 253. 255 as the wing tip moves towards the ground configuration.

The second embodiment of the invention recognises that the local translational movement (suitable for using a compression seal) can be provided a different location within the wing. In that respect, the secondary surfaces are provided with compression seal elements (not shown) that are compressed to form a seal when the wing tip device is in the flight configuration. The second embodiment continues to recognise that offsetting the lengths of the interfacing cut lines from the primary cut plane, is advantageous in limiting the length of the (transition) regions in which there is a sliding contact.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising a wing, the wing having a fixed wing with a wing tip device moveably mounted at the outer end thereof, the wing tip device being moveable between:
  (a) a flight configuration for use during flight; and
  (b) a ground configuration for use during ground-based operations, in which ground configuration the wing tip device is moved away from the flight configuration such that the span of the aircraft wing is reduced,
  wherein the wing tip device and the fixed wing are separated along a primary cut plane, the primary cut plane oblique to a plane of the wing extending in spanwise and chordwise directions, and the wing tip device being rotatable between the flight and ground configurations, about an axis of rotation orientated normal to the primary cut plane, and
  wherein when the wing tip device is in the flight configuration, the outer end of the fixed wing and the inner end of the wing tip device meet along an interfacing cut line that separates an outer surface of the fixed wing and an outer surface of the wing tip device,
  the interfacing cut line comprising:
    (i) a first length, formed by a cut between the outer surface of the fixed wing and the outer surface of the wing tip device, wherein the first length is parallel to but offset from the primary cut plane in a first direction, and the wing tip device separates from the fixed wing along the first length as the wing tip device rotates from the flight configuration to the ground configuration;
    (ii) a second length, formed by a cut between the outer surface of the fixed wing and the outer surface of the wing tip device, wherein the second length is parallel to but offset from the primary cut plane in a second direction, opposite to the first direction, and the wing tip device separates from the fixed wing along the second length as the wing tip device rotates from the flight configuration to the ground configuration; and (iii) a transition section over which the interfacing cut line transitions from the first length to the second length, wherein the wing tip device is in sliding contact with the fixed wing at the transition section as the wing tip device rotates from the flight configuration to the ground configuration.

2. The aircraft according to claim 1, wherein at least part of the transition section lies along a plane that is parallel to the primary cut plane, and the sliding contact occurs along that part of the transition section.

3. The aircraft according to claim 1, wherein the separating movement along the first and second lengths is in opposite directions.

4. The aircraft according to claim 1, wherein the wing comprises a sealing assembly for sealing between the fixed wing and the wing tip device when the wing tip device is in the flight configuration.

5. The aircraft according to claim 4, wherein the sealing assembly comprises a sliding seal for making/breaking a seal under a relative sliding action between the fixed wing and the wing tip device, and a compression seal for making/breaking a seal under a relative coming together/separation of the fixed wing and wing tip device, and wherein the sliding seal is associated with the transition section and the compression seal is associated with the first and second lengths.

6. The aircraft according to claim 4, wherein the wing comprises a first seal support structure, the first seal support structure being located below the outer surface of the fixed wing and extending beyond the first length of the interfacing cut line and towards the primary cut plane, and the first seal support structure being located below the first length of the interfacing cut line, such that the first seal support structure under-laps the interfacing cut line.

7. The aircraft according to claim 6, wherein the wing comprises a second seal support structure, the second seal support structure being located below the outer surface of the fixed wing and extending beyond the second length of the interfacing cut line and towards the primary cut plane, and the second seal support structure being located below the second length of the interfacing cut line, such that the second seal support structure under-laps the interfacing cut line.

8. The aircraft according to claim 7, wherein the outer end of the fixed wing terminates at an outer rib, and the inner end of the wing tip device terminates at an inner rib, such that when the wing tip device is in the flight configuration, the outer and inner ribs are located on opposing sides of the primary cut plane between the fixed wing and the wing tip device, and wherein the first seal support structure is part of the outer rib and the second seal support structure is part of the inner rib.

9. The aircraft according to claim 7, wherein the first and/or second seal support surfaces extend to the primary cut plane.

10. The aircraft according to claim 6, wherein the first seal support structure supports the compression seal that is compressed in a region of under-lap of the first seal support structure with respect to the interfacing cut line when the wing tip device is in the flight configuration.

11. The aircraft according to claim 1, wherein the fixed wing comprises an upper surface extending from a leading edge of the fixed wing, over the fixed wing, to a trailing edge of the fixed wing, and the fixed wing comprises a lower surface extending from the leading edge, under the fixed wing, to the trailing edge, and wherein the first and second lengths are both adjacent one of the upper surface or the lower surface of the wing.

12. The aircraft according to claim 1, wherein the interfacing cut line further comprises:

(i) a third length, formed by cut separating the outer surface of the fixed wing from the outer surface of the wing tip device, wherein the third length is offset from the primary cut plane in the first direction;

(ii) a fourth length, formed by a cut separating the outer surface of the fixed wing from the outer surface of the wing tip device, wherein the fourth length is offset from the primary cut plane in the second direction; and (iii) a second transition section over which the interfacing cut line transitions from the third length to the fourth length.

13. The aircraft according to claim 12, wherein the interfacing cut line comprises a third transition section between the first and third lengths, and a fourth transition section between the fourth and second lengths, such that the interfacing cut line is made up of the first to fourth lengths, each length transitioning into the adjacent length by a respective one of the first, section, third and fourth transition sections.

14. The aircraft according to claim 12, wherein the third and fourth lengths are both along the other one of the upper surface or the lower surface of the wing.

15. The aircraft according to claim 1, wherein the first length is located aft of the axis of rotation and the second length is located fore of the axis of rotation.

16. The aircraft according to claim 15, wherein, the third length is located aft of the axis of rotation and the fourth length is located fore of the axis of rotation.

17. The aircraft according to claim 1, wherein the transition section comprises a first portion in a plane that is parallel to the primary cut plane, and a second portion at which the interfacing cut-line extends out from the primary cut plane directly to the second length of the interfacing cut line.

18. The aircraft according to claim 1, wherein the wing comprises an inspection panel associated with at least one transition section, through which the transition section may be accessed.

19. The aircraft according to claim 18, wherein the inspection panel comprises a moveable panel operable from a closed configuration in which it forms a smooth surface of the wing, and an open configuration in which the transition section may be accessed.

20. The aircraft according to claim 18, in which the inspection panel is removeable.

21. An aircraft wing including a fixed wing and a wing tip device moveably mounted at an outer end of the fixed wing, the wing tip device being moveable between:

(a) a flight configuration for use during flight; and (b) a ground configuration for use during ground-based operations, in which ground configuration the wing tip device is moved away from the flight configuration such that the span of the aircraft wing is reduced, wherein the wing tip device and the fixed wing are separated along a primary cut plane oblique to a plane parallel to the fixed wing in spanwise and chordwise directions, and the wing tip device rotates between the flight and ground configurations about an axis of rotation orientated normal to the primary cut plane, and wherein when the wing tip device is in the flight configuration, the outer end of the fixed wing and the inner end of the wing tip device meet along an interfacing cut line that separates outer surfaces of the fixed wing and the wing tip device, the interfacing cut line comprising:
(i) a first length separating the outer surfaces of the fixed wing and the wing tip device, wherein the first length is parallel to but offset from the primary cut plane in a first direction, and the wing tip device separates from the fixed wing along the first length as the wing tip device rotates from the flight configuration to the ground configuration;
(ii) a second length separating the outer surfaces of the fixed wing and the wing tip device, wherein the second length is parallel to but offset from the primary cut plane in a second direction, opposite to the first direction, and the wing tip device separates from the fixed wing along the second length as the wing tip device rotates from the flight configuration to the ground configuration; and
(iii) a transition section in which the interfacing cut line transitions from the first length to the second length, wherein the wing tip device is in sliding contact with the fixed wing at the transition section as the wing tip device rotates from the flight configuration to the ground configuration.

22. The aircraft wing of claim 21, wherein the transition section comprises a first portion in a plane that is parallel to the primary cut plane, and a second portion at which the interfacing cut-line extends out from the primary cut plane directly to the second length of the interfacing cut line.

23. A method of designing an interface between the outer end of a fixed wing and the inner end of a wing tip device for an aircraft,
the wing tip device being moveable between:
(i) a flight configuration for use during flight; and
(ii) a ground configuration for use during ground-based operations, in which ground configuration the wing tip device is moved away from the flight configuration such that the span of the aircraft wing is reduced,
wherein the method comprises:
separating the wing tip device and the fixed wing along a primary cut plane, the primary cut plane being oblique to a plane of the fixed wing extending in spanwise and chordwise directions of the fixed wing, and the wing tip device being—rotatable between the flight and ground configurations, about an axis of rotation orientated normal to the primary cut plane,
defining an interfacing cut line that separates the outer surfaces of the fixed wing and the wing tip device, by defining
(i) a first length, formed by a cut through the outer surface and parallel to but offset from the primary cut plane in a first direction, wherein the wing tip device separates from the fixed wing along the first length as the wing tip device rotates from the flight configuration to the ground configuration;
(ii) a second length, formed by a cut through the outer surface and parallel to but offset from the primary cut plane in a second direction, opposite to the first direction; wherein the wing tip device separates from the fixed wing along the second length as the wing tip device rotates from the flight configuration to the ground configuration, and
(iii) a transition section in which the interfacing cut line transitions from the first length to the second length, wherein the wing tip device is in sliding contact with the fixed wing at the transition section as the wing tip device rotates from the flight configuration to the ground configuration.

24. The method according to claim 23 in which the wing tip device is then manufactured to that design.

25. The method of claim 23, wherein the transition section comprises a first portion in a plane that is parallel to the primary cut plane, and a second portion at which the interfacing cut-line extends out from the primary cut plane directly to the second length of the interfacing cut line.

26. An aircraft comprising a wing, the wing having a fixed wing with a wing tip device moveably mounted at the outer end of the fixed wing, the wing tip device being moveable between:
(a) a flight configuration for use during flight; and
(b) a ground configuration for use during ground-based operations, in which ground configuration the wing tip device is moved away from the flight configuration such that the span of the aircraft wing is reduced,
wherein the wing tip device and the fixed wing are separated along an oblique primary cut plane oblique to a plane extending in a-spanwise and chordwise directions of the fixed wing, and the wing tip device rotates between the flight and ground configurations about an axis of rotation orientated normal to the primary cut plane,
wherein an outer end of the fixed wing and an inner end of the wing tip device meet along an interfacing cut line that separates the outer surfaces of the fixed wing and the wing tip device,
the interfacing cut line comprising:
(i) a first length defined by a first edge portion of an outer surface of the fixed wing and a first edge portion of an outer surface of the wing tip device, wherein the first section is parallel to and offset from the primary cut plane in one of an inboard or an outboard direction, and the inner end of the wing tip device separates from the outer end of the fixed wing along the first length as the wing tip device rotates from the flight configuration to the ground configuration;
(ii) a second section defined by a second edge portion of the outer surface of the fixed wing and a second edge portion of the outer surface of the wing tip device, wherein the second section is parallel to and offset from in the primary cut plane in the other of the inboard or outboard direction, and the inner end of the wing tip device separates from the outer end of the fixed wing along the second length as the wing tip device rotates from the flight configuration to the ground configuration; and
(iii) a transition section over which the interfacing cut line transitions from the first length to the second length wherein the inner end of the wing tip device is in sliding contact with the outer end of the fixed wing at the transition section as the wing tip device rotates from the flight configuration to the ground configuration.

27. The aircraft wing of claim 22, wherein the transition section comprises a first portion in a plane that is parallel to the primary cut plane, and a second portion at which the interfacing cut-line extends out from the primary cut plane directly to the second length of the interfacing cut line.

* * * * *